United States Patent
Marcin et al.

(10) Patent No.: US 9,719,179 B2
(45) Date of Patent: Aug. 1, 2017

(54) SYSTEM AND METHOD FOR TREATMENT OF PRODUCED WATERS

(71) Applicant: High Sierra Energy, LP, Denver, CO (US)

(72) Inventors: Mark A. Marcin, Pine, CO (US); Thomas R. Sage, Golden, CO (US)

(73) Assignee: High Sierra Energy, LP, Denver, CO (US)

( * ) Notice: Subject to any disclaimer, the term of this patent is extended or adjusted under 35 U.S.C. 154(b) by 646 days.

(21) Appl. No.: 14/083,200

(22) Filed: Nov. 18, 2013

(65) Prior Publication Data

US 2014/0069821 A1    Mar. 13, 2014

Related U.S. Application Data

(63) Continuation-in-part of application No. 13/833,530, filed on Mar. 15, 2013.
(Continued)

(51) Int. Cl.
C25B 15/00 (2006.01)
C02F 9/00 (2006.01)
(Continued)

(52) U.S. Cl.
CPC .............. *C25B 15/00* (2013.01); *C02F 9/00* (2013.01); *C25B 1/14* (2013.01); *C25B 1/16* (2013.01);
(Continued)

(58) Field of Classification Search
None
See application file for complete search history.

(56) References Cited

U.S. PATENT DOCUMENTS 2,436,804 A * 3/1948 Hill .................. C07C 51/00
                                                 549/489
2,553,900 A   5/1951 Doan et al.
(Continued)

FOREIGN PATENT DOCUMENTS

WO    WO 2006/110574    10/2006

OTHER PUBLICATIONS

Guerra et al., Oil and Gas Produced Water Management and Beneficial Use in the Western Unites States, Sep. 2011, U.S. Department of the Interioir Bureau of Reclamation, pp. 1, and 41-92.*
(Continued)

*Primary Examiner* — Bobby Ramdhanie
*Assistant Examiner* — Michael An

(57) ABSTRACT

The systems and methods disclosed herein process produced/flowback water, such as high total dissolved solids produced water, to generate high purity, high value products with little to no waste. The generated high purity, high value products include caustic soda, hydrochloric acid, and/or sodium hypochlorite. Further, the methods and systems disclosed herein generate high quality brine for electrolysis through the systematic removal of contaminants such as but not limited to suspended solids, iron, sulfides, barium, radium, strontium, calcium, magnesium, manganese, fluoride, heavy metals, organic carbon, recoverable hydrocarbons, silica, lithium, and/or nitrogen containing compounds. Further, some products generated by the systems and methods disclosed herein may be recovered and reutilized or sold for other uses, such as carbon dioxide, calcium oxide, chlorine, magnesium oxide, calcium carbonate, and/or barium sulfate.

19 Claims, 15 Drawing Sheets

Related U.S. Application Data

(60) Provisional application No. 61/650,870, filed on May 23, 2012, provisional application No. 61/665,185, filed on Jun. 27, 2012.

(51) Int. Cl.
| | | |
|---|---|---|
| *C25B 1/14* | (2006.01) | |
| *C25B 1/16* | (2006.01) | |
| *C25B 1/26* | (2006.01) | |
| *C02F 1/00* | (2006.01) | |
| *C02F 1/20* | (2006.01) | |
| *C02F 1/24* | (2006.01) | |
| *C02F 1/26* | (2006.01) | |
| *C02F 1/32* | (2006.01) | |
| *C02F 1/40* | (2006.01) | |
| *C02F 1/42* | (2006.01) | |
| *C02F 1/44* | (2006.01) | |
| *C02F 1/461* | (2006.01) | |
| *C02F 1/467* | (2006.01) | |
| *C02F 1/52* | (2006.01) | |
| *C02F 1/56* | (2006.01) | |
| *C02F 1/66* | (2006.01) | |
| *C02F 1/72* | (2006.01) | |
| *C02F 11/12* | (2006.01) | |
| *C02F 1/28* | (2006.01) | |

(52) U.S. Cl.
CPC ............... *C25B 1/26* (2013.01); *C02F 1/001* (2013.01); *C02F 1/20* (2013.01); *C02F 1/24* (2013.01); *C02F 1/26* (2013.01); *C02F 1/281* (2013.01); *C02F 1/283* (2013.01); *C02F 1/32* (2013.01); *C02F 1/40* (2013.01); *C02F 1/42* (2013.01); *C02F 1/444* (2013.01); *C02F 1/4618* (2013.01); *C02F 1/4674* (2013.01); *C02F 1/5245* (2013.01); *C02F 1/56* (2013.01); *C02F 1/66* (2013.01); *C02F 1/725* (2013.01); *C02F 11/127* (2013.01); *C02F 2001/425* (2013.01)

(56) References Cited

U.S. PATENT DOCUMENTS

| | | | | |
|---|---|---|---|---|
| 3,254,719 | A | | 6/1966 | Root |
| 3,901,804 | A | * | 8/1975 | Ohuchi ............... C02F 1/5236 210/711 |
| 3,926,752 | A | * | 12/1975 | Loretto ..................... C25C 1/12 205/582 |
| 3,985,648 | A | * | 10/1976 | Casolo ..................... B01J 39/04 210/669 |
| 4,151,072 | A | * | 4/1979 | Nowack ........... C10M 175/0016 208/182 |
| 4,152,274 | A | | 5/1979 | Phillips et al. |
| 4,155,820 | A | * | 5/1979 | Ogawa .................... C25B 15/08 205/536 |
| 4,288,328 | A | * | 9/1981 | Montgomery ........ C02F 1/5236 210/713 |
| 4,397,720 | A | * | 8/1983 | Moore .................... C25B 15/08 205/536 |
| 4,457,837 | A | * | 7/1984 | Farnham .................. C10G 7/10 208/236 |
| 4,855,023 | A | * | 8/1989 | Clark ....................... B01D 1/02 134/109 |
| 4,889,638 | A | | 12/1989 | Rockford et al. |
| 4,983,297 | A | | 1/1991 | Kaczmarek et al. |
| 5,006,249 | A | | 4/1991 | Green et al. |
| 5,104,500 | A | * | 4/1992 | Ruthel ..................... B01J 45/00 205/503 |
| 5,120,935 | A | | 6/1992 | Nenninger |
| 5,213,681 | A | | 5/1993 | Kos |
| 5,342,769 | A | | 8/1994 | Hunter et al. |
| 5,368,703 | A | * | 11/1994 | Brewster ................. C02F 1/463 205/508 |
| 5,480,537 | A | * | 1/1996 | Yamasaki ............. C02F 1/5236 210/101 |
| 5,547,542 | A | * | 8/1996 | Landfors ................ B01D 61/44 162/29 |
| 5,656,173 | A | | 8/1997 | Jordan et al. |
| 5,707,514 | A | * | 1/1998 | Yamasaki ................ B01J 47/10 210/151 |
| 5,922,206 | A | * | 7/1999 | Darlington, Jr. ... B01D 17/0202 210/693 |
| 5,958,241 | A | * | 9/1999 | DeBenedetto ............. C02F 1/24 210/611 |
| 6,416,668 | B1 | * | 7/2002 | Al-Samadi ............. B01D 61/04 210/636 |
| 7,442,309 | B2 | | 10/2008 | Wilf et al. |
| 7,510,656 | B2 | | 3/2009 | Shafer et al. |
| 7,527,736 | B2 | | 5/2009 | Shafer et al. |
| 7,628,919 | B2 | | 12/2009 | Shafer et al. |
| 7,722,770 | B2 | | 5/2010 | Shafer et al. |
| 7,815,804 | B2 | * | 10/2010 | Nagghappan ............. C02F 9/00 166/267 |
| 8,088,281 | B2 | * | 1/2012 | Falkiner ................... C02F 1/26 208/187 |
| 8,105,488 | B2 | | 1/2012 | Shafer et al. |
| 8,147,696 | B1 | * | 4/2012 | Pandya ..................... C02F 1/56 210/638 |
| 8,323,495 | B2 | | 12/2012 | Shafer |
| 8,529,763 | B2 | | 9/2013 | Shafer et al. |
| 2002/0096472 | A1 | * | 7/2002 | Smith ....................... C02F 1/66 210/606 |
| 2004/0031742 | A1 | | 2/2004 | Arnaud |
| 2004/0168964 | A1 | | 9/2004 | Lambert et al. |
| 2005/0035059 | A1 | | 2/2005 | Zhang et al. |
| 2005/0098504 | A1 | * | 5/2005 | Manz ....................... C02F 1/008 210/721 |
| 2005/0131083 | A1 | | 6/2005 | Dancuart Kohler et al. |
| 2005/0167357 | A1 | | 8/2005 | Inoue et al. |
| 2006/0249390 | A1 | | 11/2006 | Yan et al. |
| 2006/0249450 | A1 | | 11/2006 | Shiotani et al. |
| 2007/0051513 | A1 | | 3/2007 | Heins |
| 2007/0102359 | A1 | * | 5/2007 | Lombardi ............. B01D 17/085 210/639 |
| 2007/0235391 | A1 | * | 10/2007 | Ylikangas ................ C02F 1/56 210/702 |
| 2008/0290033 | A1 | | 11/2008 | Kimball et al. |
| 2009/0014368 | A1 | | 1/2009 | Chen et al. |
| 2009/0084733 | A1 | * | 4/2009 | Dietz ....................... C02F 1/725 210/722 |
| 2009/0107917 | A1 | * | 4/2009 | Capehart ................... C02F 9/00 210/638 |
| 2009/0308609 | A1 | | 12/2009 | Curole et al. |
| 2010/0224564 | A1 | | 9/2010 | Shafer |
| 2011/0073543 | A1 | | 3/2011 | Shafer |
| 2011/0214986 | A1 | * | 9/2011 | Brown ..................... C25B 9/00 204/276 |
| 2012/0261347 | A1 | * | 10/2012 | Hassler ................... C02F 1/281 210/683 |
| 2012/0292259 | A1 | | 11/2012 | Marcin |
| 2013/0313199 | A1 | | 11/2013 | Marcin et al. |
| 2013/0330128 | A1 | | 12/2013 | Shafer et al. |

OTHER PUBLICATIONS

BJ Services Company, Material Safety Data Sheet, "MSDS for FRW-14", pp. 1-4. [Date unknown].

Borax, Agronomy Notes [online]. Borax, 2005, "Relative Plant Tolerance to Available Boron Supply". [retrieved on the internet on Nov. 9, 2007] <http://www.borax.com/agriculture/files/an406.pdt>, 3 pgs.

Corder, R. E., et al., "Biological Production of Methanol from Methane," downloaded from http://web.anl.gov/PCS/acsfuel/preprint%20archive/Files/33_3_LOS%20ANGELES_09-88_0469.pdf on Jun. 17, 2012, pp. 469-478.

(56) References Cited

OTHER PUBLICATIONS

Dave, Bakul, "Chapter 19: Prospects for Methanol Production," p. 235-245, in "Bioenergy" (2008).

Dow Chemical Company, Product Information Sheet, Form No. 177-01997-1103, "XUS-43594.00 A Uniform Particle Size Weak Base Anion Exchange Resin for Selective Boron Removal", pp. 1-2. [Date unknown].

Funston, R., et al., Kennedy/Jenks Consultants, 200 New Stine Road, Suite 205, Bakersfield, CA, 93309, "Evaluation of Technical and Economic Feasiblity of Treating Oilfield Produced Water to Create a "New" Water Resource," pp. 1-14.

Huang, F., et al., "Feasibility of Using Produced Water for Cross-linked Gel-Based Hydraulic Fracturing," 2005 SPE Production and Operations Symposium, Oklahoma City, OK, U.S.A., Apr. 17-19, 2005, pp. 1-12.

Lawrence, A.W., et al., "Evaluation of produced water management option in the natural gas production industry," the SPEC/EPA Exploration and Production Environmental Conference, San Antonio, TX, USA, Mar. 7-10, 1993, pp. 581-595.

Morales, M., et al., "Desalination of Produced Water Using Reverse Osmosis," GasTips, vol. 8, No. 3, pp. 13-17, Summer 2002.

Nable, Ross. O., et al., Plant and Soil, 193 Chapter 12, Boron Toxicity, pp. 181-198, 1997.

Novachis, Lawrence, "Design and Operation of Membrane Bioreactor Technology for Industrial and Municipal Wastewater Treatment," WEFTEC 1998 Pre-Conference Workshop, Membrane Technology: Physical and Biological Treatment of Industrial Wastewaters, pp. 1-13.

Purolite Ion Exchange Resins, (flyer) "S-108 Boron Selective Anion Exchange Resin (for the removal of boron salts from aqueous solutions)", Form S108_TB/0599, pp. 1-4. [Date unknown].

Sybron Chemicals Inc., a Lanxess Company, Sybron Chemical Products, Product Information, Lewatit MK 51, pp. 1-3, [retrieved online on Nov. 9, 2007] at <http://www.sybronchemicals.com/products/selective/index.htmi>.

Tsang, Patrick B., et al., "Economic Evaluation of Treating Oilfield Produced Water for Potable Use," SPE International Thermal Operations and Heavy Oil Symposium and Western Regional Meeting, Bakersfield, CA, U.S.A., Mar. 16-18, 2004, pp. 1-16.

USDA, Agricultural Research Service, US Salinity Laboratory, "Boron Tolerance Limits for Agricultural Crops" pp. 1-3, [retrieved online on the internet on Nov. 9, 2007] at <http://www.ussl.ars.usda.gov/pls/calicheIBOROT46>.

Zenon Environmental Inc., "The ZeeWeed Process Description", Section 1, pp. 1-6, Mar. 18, 2003.

ZeroNet Perspective, Produced Water Project, San Juan Generating Station, power point presentation. [Date unknown], 20 pgs.

* cited by examiner

SYSTEM AND METHOD FOR TREATMENT OF PRODUCED WATERS

RELATED APPLICATIONS

The application has been amended as follows: This application is a continuation-in-part of U.S. application Ser. No. 13/833,530 filed on Mar. 15, 2013, entitled "SYSTEM AND METHOD FOR TREATMENT OF PRODUCTED WATERS," now abandoned, which claims the benefit of U.S. Provisional Application No. 61/650,870, filed May 23, 2012, and entitled "SYSTEM AND METHOD FOR TREATMENT OF PRODUCED WATERS" and the benefit of U.S. Provisional Application No. 61/665,185, filed Jun. 27, 2012, and entitled "SYSTEM AND METHOD FOR TREATMENT OF PRODUCED WATERS," which applications are hereby incorporated herein by reference.

INTRODUCTION

The drilling of natural gas and oil wells continues to expand throughout the United States. While drilling continues to evolve and change, the one constant is the production of large amounts of contaminated water.

Typically, oil and gas exploration and production result in the extraction of a significant amount of subsurface water, called produced water, along with the hydrocarbon. The produced water contains contaminants from mineral deposits obtained far beneath the earth's surface. For example, the contaminants may include, but are not limited to, suspended solids and scale forming compounds such as sodium, chloride, iron, calcium, magnesium, barium, strontium and/or residual petroleum hydrocarbons.

Treatment of Produced Waters

The systems and methods disclosed herein process produced water, such as high total dissolved solids (TDS) produced water, to generate high purity, high value products with little to no waste. The generated high purity, high value products include caustic soda, hydrochloric acid, and/or sodium hypochlorite. Further, the methods and systems disclosed herein generate high quality brine for electrolysis through the systematic removal of contaminants such as but not limited to suspended solids, iron, sulfides, barium, radium, strontium, calcium, magnesium, manganese, fluoride, heavy metals, organic carbon, recoverable hydrocarbons, silica, lithium, and/or nitrogen containing compounds. Further, some products generated by the systems and methods disclosed herein may be recovered and reutilized or sold for other uses, such as carbon dioxide, calcium oxide, chlorine, magnesium oxide, calcium carbonate, and barium sulfate.

In part, this disclosure describes a system for treating contaminated water to produce at least one of sodium hydroxide, hydrochloric acid, and sodium hypochlorite. The system includes:

a coagulation tank configured to oxidize and coagulate effluent from waste water influent;

a first pH adjustment tank configured to adjust a pH of effluent from the coagulation tank;

a first floc mix tank configured to add a first flocculant to effluent from the first pH adjustment tank;

an iron clarifier configured to separate iron from effluent from the first floc mix tank;

a second pH adjustment tank for adjusting the pH of effluent from the iron clarifier;

at least one multimedia filter configured to filter effluent from the second pH adjustment tank;

a first organics removal system configured to remove at least petroleum hydrocarbons from effluent from the at least one multimedia filter;

a first heat exchanger configured to heat effluent from the first organics removal system;

a third pH adjustment tank configured to adjust the pH of effluent from the first heat exchanger;

a softening clarifier configured to remove calcium carbonate and magnesium hydroxide sludge from effluent from the third pH adjustment tank;

a weak acid cation ion exchange column and a chelating ion exchange column configured to remove any remaining calcium and remaining magnesium to a level of less than 50 ppb from effluent from the softening clarifier;

a fourth pH adjustment tank configured to adjust the pH of effluent from the weak acid cation ion exchange column and the chelating ion exchange column;

a second floc mix tank configured to add a second flocculant to effluent from the fourth pH adjustment tank;

an aluminum clarifier configured to remove aluminum from effluent from the second floc mix tank.

a fifth pH adjustment tank configured to adjust the pH of effluent from the aluminum clarifier;

a membrane system configured to allow transport of ammonium ions across a semipermeable membrane into a cross flowing solution containing sulfuric acid to remove ammonium from effluent from the fifth pH adjustment tank;

an ammonia stripping tower configured to remove remaining ammonia from effluent from the membrane system;

a sixth pH adjustment tank configured to adjust the pH of effluent from the ammonia stripping tower;

a polishing tank configured to remove fluoride by using activated alumina from effluent from the sixth pH adjustment tank;

a filter configured to remove colloidal solids from effluent from the polishing tank;

a second organics removal system configured to remove at least one of organic acid and alcohol from effluent from the filter;

an evaporative brine concentrator configured to concentrate effluent from the second organics removal system, wherein effluent from the evaporative brine concentrator is a concentrated purified brine;

at least one electrolysis unit configured to convert the concentrated purified brine into at least one of sodium hydroxide, hydrochloric acid, and sodium hypochlorite. The system for treating contaminated water does not form any waste product that requires disposal in an EPA regulated Class II disposal well.

Additionally, the disclosure describes a method for producing at least one of sodium hydroxide, hydrochloric acid, and sodium hypochlorite from contaminated water. The method includes:

removing iron from influent water to produce an iron reduced effluent;

removing petroleum hydrocarbons from the iron reduced effluent to produce an organics reduced effluent;

removing at least one of calcium and magnesium from the organics reduced effluent to produce a softened effluent;

removing aluminum from the softened effluent to produce a clarified effluent;

removing ammonia from the clarified effluent to produce a purified brine;

treating the purified brine with cation and ion exchange resins to form a scale ion free brine;

polishing the scale ion free brine to produce a polished brine;

removing at least one of organic acid and alcohol from the polished brine to produce an organics reduced brine;

evaporating the organics reduced brine to produce a concentrated brine; and treating the concentrated brine with electrolysis to produce at least one of sodium hydroxide, hydrochloric acid, and sodium hypochlorite.

Further, the disclosure describes a system for treating contaminated water to produce at least one of sodium hydroxide, hydrochloric acid, and sodium hypochlorite. The system includes:

a separated solids and iron removal system;

a first organics removal system that removes at least petroleum hydrocarbons located downstream of the separated solids and iron removal system;

a soda softening system located downstream of the first organics removal system;

an aluminum removal system located downstream of the soda softening system;

an ammonia removal system located downstream of the aluminum removal system;

a polishing system located downstream of the ammonia removal system;

a second organics removal system that removes at least one of organic acid and alcohol located upstream of a brine evaporation system and downstream from the first organics removal system;

the brine evaporation system located downstream of the polishing system and the second organics removal system; and an electrolysis system located downstream of the brine evaporation system. The system is configured to produce at least one of sodium hydroxide, hydrochloric acid, and sodium hypochlorite.

Additionally, the disclosure describes a system for treating contaminated water to produce at least one of sodium hydroxide, hydrochloric acid, and sodium hypochlorite. The system includes: a first coagulation tank, a first pH adjustment tank, a first floc mix tank, an iron clarifier, at least one multimedia filter, a first organics removal system, a second pH adjustment tank, a softening clarifier, a third pH adjustment tank; a filter; a second organics removal system; an evaporative brine concentrator; a weak acid cation ion exchange column and a first chelating ion exchange column; a reduction tank; a third organics removal system; a fourth pH adjustment tank; a second chelating ion exchange column; a fifth pH adjustment tank; a bromine oxidation tank; a sixth pH adjustment tank; and at least one electrolysis unit. The first coagulation tank oxidizes and coagulates effluent from waste water influent. The first pH adjustment tank adjusts a pH of effluent from the first coagulation tank. The first floc mix tank adds a first flocculant to effluent from the first pH adjustment tank. The iron clarifier separates iron from effluent from the first floc mix tank. The at least one multimedia filter filters effluent from the iron clarifier. The first organics removal system removes at least petroleum hydrocarbons from effluent from the at least one multimedia filter. The second pH adjustment tank adjusts the pH of effluent from the first organics removal system. The softening clarifier removes calcium carbonate and magnesium hydroxide sludge from effluent from the second pH adjustment tank. The third pH adjustment tank adjusts the pH of effluent from the weak acid cation ion exchange column and the chelating ion exchange column. The filter removes colloidal solids from effluent from the third pH adjustment tank. The second organics removal system removes at least alcohol and ammonia from effluent from the filter. The evaporative brine concentrator concentrates effluent from the second organics removal system. The effluent from the evaporative brine concentrator is a concentrated purified bine. The weak acid cation ion exchange column and a first chelating ion exchange column remove any remaining calcium and remaining magnesium to a level of less than 50 ppb from effluent from the evaporative brine concentrator. The reduction tank depresses the pH and reduces bromate and iodate in the effluent from the first chelating ion exchange column. The third organics removal system removes at least organic acids from effluent from the reduction tank. The fourth pH adjustment tank adjusts the pH of effluent from the third organics removal system. The second chelating ion exchange column removes trace metals from effluent from the fourth pH adjustment tank. The fifth pH adjustment tank adjusts the pH of effluent from the second chelating ion exchange column. The bromine oxidation tank removes bromine and iodine from effluent from the fifth pH adjustment tank. The sixth pH adjustment tank adjusts the pH of effluent from the second chelating ion exchange column. The at least one electrolysis unit converts the concentrated purified brine into at least one of sodium hydroxide, hydrochloric acid, and sodium hypochlorite. The system for treating contaminated water does not form any waste product that requires disposal in an EPA regulated Class II disposal well.

Further, the disclosure describes a method for producing at least one of sodium hydroxide, hydrochloric acid, and sodium hypochlorite from contaminated water. The method includes:

removing iron from influent water to produce an iron reduced effluent;

removing petroleum hydrocarbons from the iron reduced effluent to produce a petroleum hydrocarbon reduced effluent;

removing at least one of calcium and magnesium from the petroleum hydrocarbon reduced effluent to produce a softened effluent;

removing at least alcohol and ammonia from the softened effluent to produce an alcohol and ammonia reduced brine;

evaporating the alcohol and ammonia reduced brine to produce a concentrated brine;

removing at least organic acid from the concentrated brine to produce an organic acid reduced brine;

removing iodine and bromine species from the organic acid reduced brine to produce a polished brine; and treating the polished brine with electrolysis to produce at least one of sodium hydroxide, hydrochloric acid, and sodium hypochlorite.

In yet another embodiment, the disclosure describes a system for treating contaminated water to produce at least one of sodium hydroxide, hydrochloric acid, and sodium hypochlorite. The system includes a separated solids and iron removal system, a first organics removal system, a soda softening system, a second organics removal system, a brine evaporation system, a third organics removal system, and an electrolysis system. The first organics removal system removes at least petroleum hydrocarbons located downstream of the separated solids and iron removal system. The soda softening system is located downstream of the first organics removal system. The second organics removal system removes alcohol and ammonia and is located upstream of a brine evaporation system and downstream from the first organics removal system. The brine evaporation system is located downstream of the soda softening system and the second organics removal system. The third organics removal system removes at least organic acid located downstream of the brine evaporation unit. The electrolysis system is located downstream of the third organics removal system. The system is configured to produce at least one of sodium hydroxide, hydrochloric acid, and sodium hypochlorite.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope of the invention in any manner, which scope shall be based on the claims.

The following drawing figures, which form a part of this application, are illustrative of embodiments of systems and methods described below and are not meant to limit the scope of the invention in any manner, which scope shall be based on the claims.

FIG. 1A illustrates an embodiment of an oil removal and recovery system and an iron removal system, a first organics removal system, a strontium removal system, and a portion of a barium removal system.

FIG. 1B illustrates an embodiment of a portion of the barium removal system, a soda softening system, an aluminum removal system, a lithium removal system, an ammonia removal system, an ion and cation exchange system, and a portion of the polishing system in the water treatment system according to the principles of the present disclosure.

FIG. 1C illustrates an embodiment of a portion of a polishing system, a brine purification system, a second organics removal system, a brine evaporation system, and an electrolysis system in the water treatment system for treating contaminated water according to the principles of the present disclosure.

FIG. 1D illustrates an embodiment of downstream processing systems for removed barium sludge, recovered oil, and produced chlorine gas in the water treatment system for treating contaminated water according to the principles of the present disclosure.

FIG. 1E illustrates an embodiment of downstream processing systems for removed iron sludge, produced sodium hydroxide, produced hydrochloric acid, produced sodium hypochlorite, and removed lithium sludge in the water treatment system for treating contaminated water according to the principles of the present disclosure.

FIG. 1F illustrates an embodiment of downstream processing systems for removed calcium carbonate sludge in the water treatment system for treating contaminated water according to the principles of the present disclosure.

DETAILED DESCRIPTION

Figure 1A:
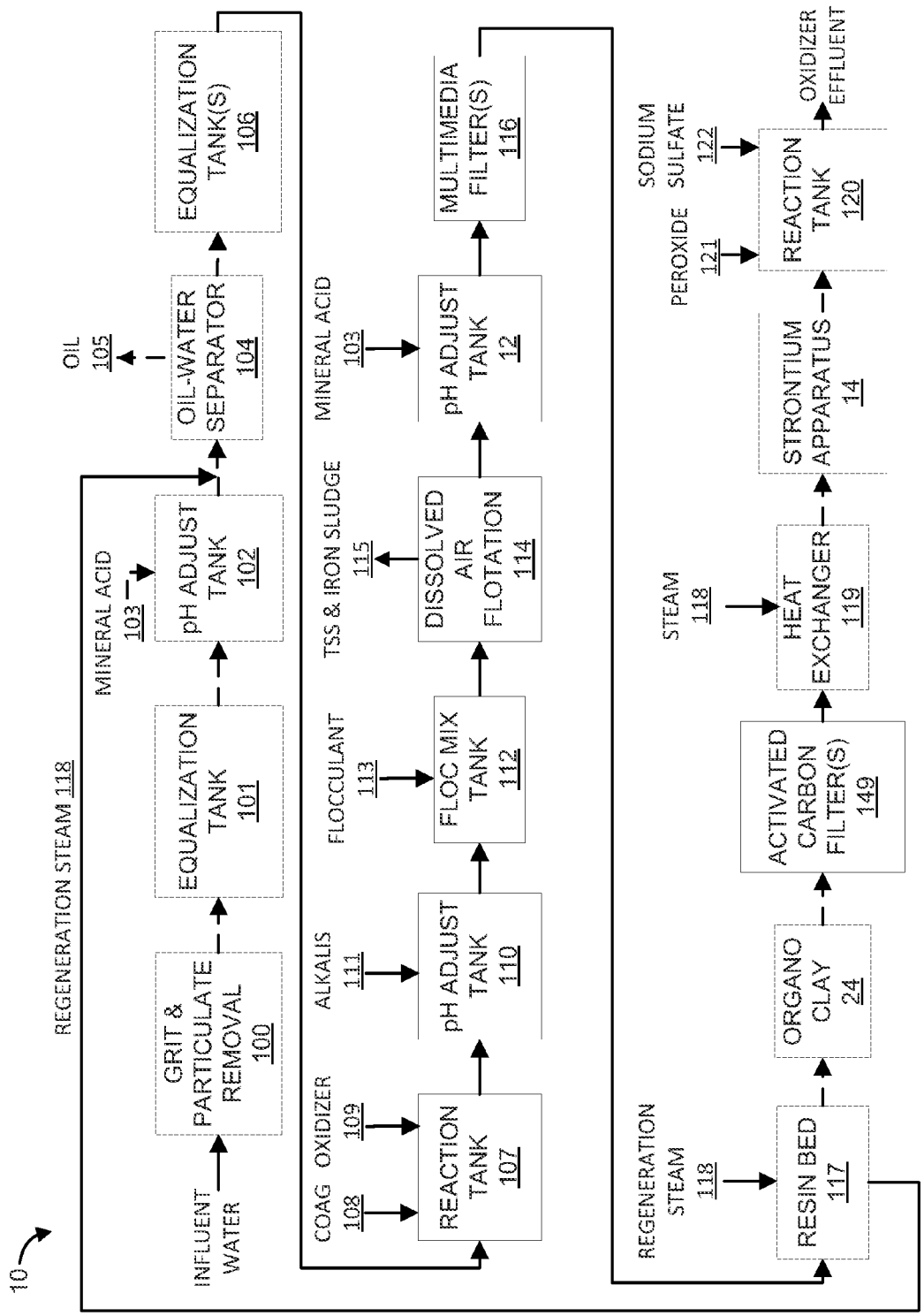
FIGS. 1A-1F illustrate an embodiment of a water treatment system for treating contaminated water to produce sodium hydroxide, hydrochloric acid, and/or sodium hypochlorite from purified brine according to the principles of the present disclosure.

Unless otherwise indicated, all numbers expressing quantities of ingredients, properties such as molecular weight, concentrations, reaction conditions, temperatures, and so forth used in the specification and figures are to be understood as being modified in all instances by the term "about." Accordingly, unless indicated to the contrary, the numerical parameters set forth in the following specification and figures are approximations that may vary depending upon the desired properties sought to be obtained. At the very least, and not as an attempt to limit the application of the doctrine of equivalents to the scope of specification and figures, each numerical parameter should at least be construed in the light of the number of reported significant digits and by applying ordinary rounding techniques.

When referring to concentrations of contaminants in water or to water properties such as pH and viscosity, unless otherwise stated the concentration refers to the concentration of a sample properly taken and analyzed according to standard Environmental Protection Agency (EPA) procedures using the appropriate standard test method or, where no approved method is available, commonly accepted methods may be used. For example, for Oil and Grease the test method identified as 1664A is an approved method. In the event two or more accepted methods provide results that indicate two different conditions as described herein, the condition should be considered to have been met (e.g., a condition that must be "above pH of about 7.0" and one accepted method results a pH of 6.5 and another in pH of 7.2, the water should be considered to be within the definition of "about 7.0").

The level of contamination for produced water varies with geography and shale basins. For example, the Bakken, Marcellus, and Utica contain some of the most contaminated produced waters. These produced waters typically contain high total dissolved solids (TDS) in excess of 150,000 mg/l primarily as sodium chloride. Treatment for disposal by discharge to a river system under the regulations of a National Pollution Discharge Elimination System (NPDES) permit has diminishing returns. Due to the starting concentration of salt in these waters, thermal evaporation systems may only be able to recover 40-50% of the incoming volume as high quality distillate suitable for discharge. To generate this high quality distillate, requires significant pretreatment and removal of scale forming salts such as calcium. This requirement only acts to increase the cost of evaporation technology. The result is a small volume reduction of up to 40-60% and the reality of having to dispose of highly concentrated brine containing over 260,000 mg/l sodium chloride. Disposal of this brine in an EPA regulated Class II disposal well is the only remaining option. This disposal methodology may require transportation of the concentrated waste long distances by truck, sometimes to a neighboring state. The cost to truck this water then becomes a significant burden to exploration and production (E&P) companies and could eventually restrict further exploration in these rich natural resource but high TDS basins.

Accordingly, The systems and methods disclosed herein process produced water, such as high TDS produced water, to generate high purity, high value products with little to no waste. The generated high purity, high value products include caustic soda, hydrochloric acid, and/or sodium hypochlorite. Further, the methods and systems disclosed herein generate high quality brine for electrolysis through the systematic removal of contaminants such as but not limited to suspended solids, iron, sulfides, barium, radium, strontium, calcium, magnesium, manganese, fluoride, heavy metals, organic carbon, recoverable hydrocarbons, silica, methanol, lithium, and/or nitrogen containing compounds. Further, some products generated by the systems and methods disclosed herein may be recovered and reutilized or sold for other uses, such as carbon dioxide, calcium oxide, chlorine, magnesium oxide, calcium carbonate, iron chloride, hydrogen gas, and barium sulfate. If there is any produced waste, the waste can be disposed through conventional and non-conventional disposal methods and/or systems.

Therefore, the systems and methods disclosed herein provide for an environmentally friendly process since several of the compounds added are regenerated during later downstream processing. Further, the systems and methods disclosed herein process the water to an extent that none of treated water or resulting products are labeled as EPA regulated Class II, which requires specific disposal wells. The elimination of contaminated water labeled as EPA regulated Class II also in turn reduces the costs of disposal. Further, the generation of high purity products allows these products to be sold and/or reutilized reducing environmental effects and/or reducing treatment costs.

The high TDS waters from basins such as the Bakken, Marcellus, and Utica shale's can be processed with systems and methods disclosed herein, which utilizes almost 100% of the produced water generated and received at a treatment facility as raw material for the manufacture of products which can be sold into markets both in the United States and abroad. The systems and method disclosed herein are not limited to those basins which exhibit high TDS produced waters. The disclosed systems and methods could be applied to any produced water that has been concentrated through various treatment technologies such as reverse osmosis, forward osmosis, membrane evaporation or thermal evaporation systems.

FIGS. 1A-1F illustrates an embodiment of a system 10 for processing produced water. As illustrated in FIG. 1A, the flowback/produced water is input into the system 10. In some embodiments, the flowback/produced water arrives by truck. In other embodiments, the flowback/produced water arrives by pipeline. In one embodiment, the produced water or influent water contains greater than 100,000 mg/L of TDS. This concentration of TDS is exemplary only and produced water with other concentrations of TDS may be treated by system 10. In some embodiments, the flowback/produced water input into system 10, prior to treatment with system 10 would require disposal in an EPA regulated Class II disposal well. None of the products or effluent water produced from system 10 require disposal in an EPA regulated Class II disposal well.

In some embodiments, the flowback/produced water is mechanically screened using wastewater screening equipment 100 such as hydrosieves, semi-automatic backwashing filters and rotary screens to form screened water. This screening removes large particulates which may affect the pumping equipment downstream. Any suitable screening method for treating the produced water may be utilized by system 10.

In some embodiments, the screened water from the wastewater screening equipment 100 or the flowback/produced water is input into one or more surge tanks 101 to form equalized produced/flowback water. The surge tank 101 compensates for flow and concentration variations caused by numerous trucks unloading at any given time.

In embodiments where oil is removed from the flowback/produced water, the screened water, the flowback/produced water, and/or the equalized produced/flowback water is input or transferred to a pH adjustment tank 102 whereby the pH is depressed to about 4-5 using a mineral acid 103. In some embodiments the mineral acid 103 is hydrochloric or sulfuric acid 141. The pH reduction accentuates the removal of oils or hydrocarbons in downstream equipment. The pH may be adjusted using any conventional means, such as through the addition of mineral acids (e.g., hydrochloric and sulfuric acids) or by adding carbon dioxide gas. In some embodiments, the mineral acid 103 is hydrochloric acid 157 produced by a downstream electrolysis unit 155. In other embodiments, the mineral acid 103 is purchased.

In some embodiments, the pH adjusted produced/flowback water from the pH adjustment tank 102 is pumped into a coalescing oil/water separator 104 to form produced/flowback water containing only water soluble oil and petroleum hydrocarbons 105 and trace C20 hydrocarbons. In embodiments, where the produced/flowback water does not contain any or very little oil, the oil removal and reduction system including the coalescing oil/water separator 104 and the pH adjustment tank 102 are not utilized. The separator 104 removes hydrocarbons with carbon chain lengths of greater than C20 and droplet sizes greater than 20 microns also known. Any coalescing oil/water separator 104 as known in the art may be utilized by system 10. In some embodiments, the removal efficiency of this droplet size is greater than 95%. In addition, lower chain petroleum hydrocarbons 105 which are at a concentration in the water that exceeds the solubility of that contaminate in water will be removed at this point. For example, the water solubility of benzene is 1780 mg/l; therefore, any concentrations of benzene above this concentration are separated, due to specific gravity differential, out of the water and are easily removed by the oil/water separator 104. The oil and petroleum hydrocarbons 105 are separated from the pH adjusted produced/flowback water and then removed. In some embodiments, the removed oil and petroleum hydrocarbons 105 are dewatered utilizing a dewatering system 27 and then pumped to storage tanks 30 for resale as illustrated in FIG. 1D. Any suitable dewatering system 27 may be utilized, such as a centrifuge.

In some embodiments, the produced/flowback water containing only water soluble petroleum hydrocarbons 105 and trace C20 hydrocarbons from the oil/water separator 104 flows into an equalization tank 106. In other embodiments, the grit removed water from the wastewater screening equipment 100 flows into an equalization tank 106. In some embodiments, multiple equalization tanks 106 are utilized. In embodiments, an equalization tank 106 is capable of storing a production volume equal to approximately 1 day of treatment based upon facility design. Equalization tanks may be added throughout system 10 as needed or as desired.

The pH adjusted produced/flowback water from the pH adjustment tank 102, the produced/flowback water containing only water soluble petroleum hydrocarbons 105 and trace C20 hydrocarbons from the oil/water separator 104, or the equalized produced/flowback water from the equalization tank 106 is transferred to a coagulation tank 107 where a small amount of oxidizer 109, such as but not limited to hydrogen peroxide, sodium hypochlorite 158, chlorine dioxide, sodium persulfates and permanganates, is added. In some embodiments, sodium hypochlorite 158 is added because sodium hypochlorite 158 is generated in the downstream electrolysis unit 155, such as during start-up and shut down. This coagulation tank 107 oxidizes ferrous iron to ferric iron and sulfides to sulfates. The equalized produced/flowback water from the coagulation tank 107 is also treated with a coagulant 108. The coagulant 108 may be any inorganic coagulant 108 containing iron or aluminum 121. In some embodiments, the coagulant 108 may be organic coagulants such as polyamines and poly-DADMCs.

Coagulated water from the reaction tank or coagulation tank 107 flows into pH adjustment tank 110 where the pH is again adjusted to a pH of 6.5-7.5 using alkalis 111 such as caustic soda 156, potassium hydroxide, sodium carbonate 166, lime, and magnesium hydroxide. In some embodiments, the alkalis 111 is a caustic soda 156 produced by the downstream electrolysis unit 155. In other embodiments, the alkali 111 is a caustic soda 156 that is purchased. In some embodiments, sodium based alkalis 111 are utilized since the use of sodium based alkalis 111 contribute to the conversion back to caustic soda 156 in the downstream electrolysis unit 155.

The pH adjusted water from the pH adjustment tank 110 is then treated with a flocculant 113 in floc mix tank 112. The flocculated produced water from the floc mix tank 112 flows into a solids/liquid separation system 114. In some embodiments, the solids/liquid separation system 114 is a gravity and/or an air floatation system, such as a dissolved air flotation system (DAF), known to those skilled in the art.

In some embodiments, the flocculated or separated solids 115 from the solids/liquid separation system 114 pass into a filtration system which may consist of a multimedia filter, a membrane system, or a hollow fiber ultrafiltration membrane system. The separated solids 115 may also be subject to end processing as illustrated in FIG. 1E. For example, the separated solids 115 are dewatered. The separated solids 115 may mainly include iron hydroxides and iron carbonates. The separated solids 115 may be dewatered by utilizing a dewatering system 27. Any suitable dewatering system 27 or methods as known to those skilled in the art for dewatering may be utilized. After dewatering, the separated solids may be transported to a landfill 28 for disposal. In some embodiments, filtrate from the dewatering process is sent back to the beginning of system 10 for reprocessing.

The water from the solids/liquid separation system 114 is then sent to another pH adjustment tank 12, whereby the pH is depressed again to about 4-6.5 using a mineral acid 103. In some embodiments the mineral acid is hydrochloric or sulfuric acid 141. The pH reduction accentuates the removal of total organic carbon (TOC) in downstream equipment. The pH may be adjusted using any conventional means, such as through the addition of mineral acids (e.g., hydrochloric and sulfuric acids) or by adding carbon dioxide gas. In some embodiments, the mineral acid 103 is hydrochloric acid 157 produced by a downstream electrolysis unit 155. In other embodiments, the mineral acid 103 is purchased. Unexpectedly, the removal of TOC varied. Upon investigation it was found that the manipulation of the pH after the solids separation by solids/liquid separation system 114 maximized TOC reduction. Accordingly, pH adjustment tank 12 was added to system 10 to maximize TOC reduction.

The first organics removal system includes a pH adjustment tank 12, filter 116, and TOC removal system. The pH adjusted water from the pH adjustment tank 12 is then sent through one or more filters 116. In some embodiments, the filter 116 is a multimedia filter or equivalent. In other embodiments, the filter 116 is a membrane filter, sand filter, and/or bag filter. The filtered water from the filter 116 is then passed through a TOC removal system where at least a portion of the petroleum hydrocarbons in the gasoline, diesel, and oil range are adsorbed.

In some embodiments, the TOC removal system is a resin bed 117, such as a Dow Optipore L493® resin bed as sold by the Dow Chemical Company headquartered at 2030 Dow Center, Midland, Mich. 48674. The resin in the resin bed 117 acts as an absorbent for organics lowering the overall total organic carbon (TOC) footprint of this water. The resin, such as an Optipore resin, may be regenerated with steam 118. In some embodiments, the steam is supplied by a facilities boiler system. After regeneration, the steam is condensed through cooling. In some embodiments, the condensate from the resin bed 117 is separated into two phases allowing recovery of the petroleum hydrocarbons. In further embodiments, the separated condensate or steam 118 is transferred to the oil storage tank. The stored hydrocarbons are suitable for resale.

The Dow resin from the Dow Optipore L493 resin bed provides several benefits. For example, the Dow resin from the Dow Optipore L493 resin bed has a high surface area and a more widely distributed pore size than activated carbon and offers the benefit of onsite regeneration with steam and high absorption capacity. Further, the absorption capacity of the Dow resin is estimated at 21% w/w meaning 100 pounds of Dow resin could absorb 21 pounds of total petroleum hydrocarbons (TPH). Additionally, the Dow resin requires 5 pounds of steam per pound of TPH or resin removed for regeneration.

The Optipore L493 resin has shown to be able to reduce TOC from 225 mg/l to 140 mg/l as well as removal of BTEX of up to 99.98%. TOC removal is totally dependent upon the characteristic make-up of the organics in the produced/flowback water. BTEX removal has been documented down to the low ppb level.

However, when the produced/flowback water has low levels of recoverable hydrocarbons, the TOC removal system may be an organo-clay 24. The organo-clay 24 can be utilized to adsorb organics or TOC instead of utilizing a resin bed 117. For example, an organo-clay, such as Hydrosil HS-200® as sold by Hydrosil International Ltd. Located at 1180 St. Charles Street, Elgin, Ill. 60120, has been found to adsorb up to 70% of its weight in oils and BTEX. The organo-clay material is generally not regenerated. Accordingly, once the organo-clay reaches absorption capacity, the resin is removed and disposed in a secure landfill. The disposed resin or organo-clay will pass all EPA Toxicity Characteristic Leaching Procedure tests.

The water with reduced TOC from the organics removal system is then pumped into one or more activated carbon columns 149 for polishing and removal of trace contaminants, such as iodine and some metals. Some organic substances will be removed in this step to continue to reduce the TOC. In some embodiments, depending on the influent concentration of iodine, activated carbon may be used to recover and recycle the iodine for resale. In some embodiments, the activated carbon columns 149 and the organoclay 24 are combined.

In some embodiments, water from the one or more activated carbon columns 149 is heated as illustrated in FIG. 1A. The water may be heated to about 90-120 degrees Fahrenheit to accelerate the rate of reaction in the reaction tank 120. In some embodiments, water is heated by using a plate and frame or shell in tube heat exchanger 119 with the source of heat being the condensate or the high quality distillate 154 generated by the downstream evaporation system 153 located downstream of these components. In some embodiments, the temperature may be increased beyond 120 degrees to further enhance the reaction.

In some embodiments, the heated water or the water from the one or more activated carbon columns 149 from the first organics removal system is run through a strontium removal apparatus 14. The strontium removal apparatus 14 removes strontium from the heated water or the water from the one or more activated carbon columns 149. In some embodiments, the strontium removal apparatus 14 is a strontium specific ion exchange resin. For example, iron oxide coated sand may be utilized to reduce the levels of strontium in the heated water or the water from the one or more activated carbon columns 149. The strontium removal apparatus 14 is designed to create an effluent with less than 0.1% strontium. In some embodiments, the heated water or the water from the one or more activated carbon columns 149 has a concentration of strontium of about 5%. However, this level of strontium is exemplary only and will vary based on the produced/flowback water treated by the system 10.

The level of the strontium in the produced/flowback water was higher than expected. Accordingly, the barium solids/liquid separator 125 did not remove enough strontium for the sale of some downstream products. For example, the removal of the strontium from the heated water or the water from the one or more activated carbon columns 149 is particularly useful in the sale of calcium carbonate. For example, some vendors will only purchase calcium carbonate if the levels of strontium are below 0.1%. For instance, while calcium carbonate with levels of strontium of around 5% may be sold for use in concrete, other vendors that use calcium carbonate as a neutralizer in acid mine drainage or as an acid gas neutralizer in coal burning power plants require a strontium level of below 0.1%. In some embodiments, for every 1 mg/l strontium in the water 1.62 mg/l of sodium sulfate or 1.119 mg/l sulfuric acid is utilized for the removal of the strontium. While the FIG. 1A shows the strontium removal apparatus 14 downstream from the organics removal system, the strontium removal apparatus 14 may be located before the solids/liquid separator 129 or before the solids/liquid separator 125.

In embodiments where barium is removed from the influent water, the water for the organics removal system, the heated water or the water from the strontium removal apparatus 14 flows into another reaction tank 120. Sulfuric acid 141 and/or sodium sulfate 122 are added to the reaction tank 120 at or near a stoichiometric amount to precipitate barium. In some embodiments, the sulfuric acid 141 and/or sodium sulfate 122 are added to the reaction tank 120 at or near a stoichiometric amount to precipitate out additional or remaining strontium as sulfates in addition to the barium. In some embodiments, sodium sulfate 122 is utilized because sodium sulfate 122 produces lower barium residual and does not require vast amounts of caustic soda 156 for neutralization when compared to other precipitating reagents like sulfuric acid. This reaction is conducted under acidic conditions and in some embodiments, a high concentration of an oxidizer 109 is added. The oxidizer 109 may be, but is not limited to, hydrogen 174 peroxide, sodium or potassium permanganates, sodium or potassium persulfates, ozone and/or other advanced oxidation technologies known to those skilled in the art. Further, in some embodiments, the addition of an oxidizer 109 further oxidizes some of the residual petroleum hydrocarbons 105 and reduces total organic carbon (TOC). For example, potassium permanganate has demonstrated TOC removals up to 50% on some samples of Marcellus produced waters. In some embodiments, the contact time in this step is less than 30 minutes.

In embodiments, where barium and strontium are removed from the influent water, the water from reaction tank 120 then flows into another pH adjustment tank 123 where caustic soda 156 or other alkalis 111 such as magnesium hydroxide, calcium hydroxide, and/or potassium hydroxide are added to raise the pH to a neutral level. In some embodiments, every 1 mg/l Barium in the water requires the addition of 1.034 mg/k sodium sulfate or 0.714 mg/l sulfuric acid.

This pH adjustment is beneficial for following solids/liquid separation steps, such as flocculation. In some embodiments, the alkalis 111 are sodium based alkalis since sodium alkalis eventually convert to caustic soda 156 during downstream electrolysis by the electrolysis unit 155. In some embodiments, the caustic soda 156 is the caustic soda 156 produced by the downstream electrolysis unit 155. In other embodiments, the caustic soda 156 is purchased.

Figure 1B:
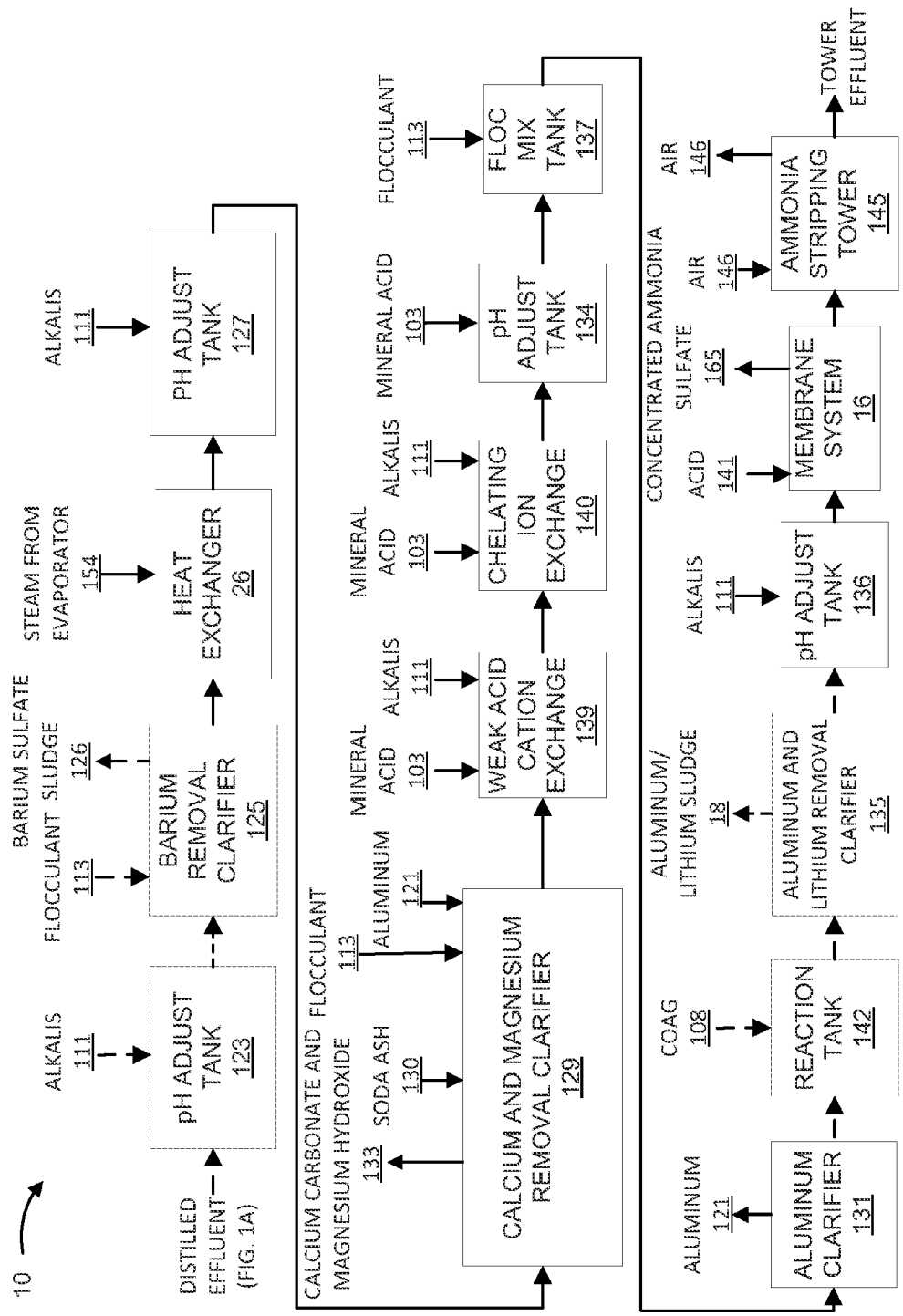

In embodiments where barium is removed from the influent water, the pH adjusted water from the pH adjustment tank 123 flows into a solids/liquid separator 125 as illustrated in FIG. 1B. In other embodiments, barium is not removed by system 10. A flocculant 113 is added to the pH adjusted water in the solids/liquid separator 125. In some embodiments, the solids/liquid separator 125 is a gravity clarifier or an air floatation clarifier. In some embodiments, when hydrogen peroxide is utilized, the solids/liquid separator 132 is a dissolved air floatation clarifier.

In some embodiments, the pH adjusted water may be sent directly to a high volume dewatering process such as a centrifuge. In further embodiments, the water after passing though the solids/liquid separator 132 may also pass through a filtration device, such as a multimedia filter or a membrane filter for further solids/liquid separation. The solids/liquid separator 125 removes precipitated barium out of the water as barium sulfates and in some embodiments removes precipitated strontium out of the water as strontium sulfates. Further, in some embodiments, the solids/liquid separator 125 further oxidizes some of the residual petroleum hydrocarbons and reduces total organic carbon (TOC).

The separated solids 126 may then be subjected to end processing as illustrated in FIG. 1D. For example, the separated solids 126, precipitated barium sulfate, are then dewatered. The separated solids 126 may be dewatered by utilizing a dewatering system 27. The separated solids 126 may be dewatered by utilizing any known methods or system for dewatering. These dewatered solids may be sent to a landfill 28 or further processed. For example, the solids 126 may be washed to remove residual sodium chloride. Further, the separated solids 126, precipitated barium and strontium sulfate may be dried in a dryer 32. The dried barium and/or strontium sulfate are suitable for sale. Accordingly, the dried barium and/or strontium sulfate may be stored for sale 30. For example, the dried barium may be sold to E&P companies for use in drilling muds.

The clarified produced/flowback water from the solids/liquid separator 125 or the water from the pH adjustment tank 123 flows into a heat exchanger 26. The water may be heated to about 90-120 degrees Fahrenheit to improve removal of calcium and magnesium in the removal clarifier. In some embodiments, water is heated by using a plate and frame or shell in tube heat exchanger with the source of heat being the condensate or the high quality distillate 154 generated by the downstream evaporation system 153 located downstream of these components. In some embodiments, the temperature may be increased beyond 120 degrees to further enhance the reaction. In other embodiments, the heat for heat exchanger 26 is from a source separate from system 10. In some embodiments, the heat exchanger 119 and heat exchanger 26 are similar.

The heated water from the heat exchanger 26 is flowed into another pH adjustment tank 127 to initiate a softening process. While the embodiments below are an example of a precipitative softening process, other methods of precipitative softening may be implemented by those skilled in the art. In the pH adjustment tank 127, the pH is adjusted to about 10.5-12.0. In some embodiments, sodium hydroxides is the reagent 128 utilized to adjust the pH of the clarified produce/flowback water. In alternative embodiments, other reagents 128 or a combination thereof are utilized to adjust the pH, such as calcium oxide/hydroxide and potassium hydroxide. In further embodiments, magnesium sulfate may be added to tank 127 to assist in the removal of silica. In other embodiments, the reagent 128 is a caustic soda 156 generated by the electrolysis unit 155 during downstream processing. In some embodiments, the reagent 128 is purchased.

Once the pH adjustment is completed, the pH adjusted water from the pH adjustment tank 127 flows into another solids/liquid separator 129 as illustrated in FIG. 1B. Soda ash 130 or some form of carbonate or carbon dioxide gas is added to the solids/liquid separator 129 at or near a stoichiometric amount to precipitate the calcium, barium, strontium, and other contaminants, typically as their carbonate or hydroxide forms. Alternatively, soda ash 130 may be added in tank 127 prior to the addition of caustic 156 or other alkali 111. A coagulant 108 of aluminum 121 or iron is added to the solids/liquid separator 129 to promote particle growth. Further, excess amounts of aluminum 121 may be added to the solids/liquid separator 129 to aid in the removal of fluoride. For example, the water discharged from the solids/liquid separator 129 has an aluminum residual of greater than 60 mg/L. In other embodiments, a coagulant 108 of iron is added in addition to the aluminum to the solids/liquid separator 129 to promote particle growth.

After the addition of the coagulant 108, a flocculant 113 is added to the solids/liquid separator 129. In some embodiments, the solids/liquid separator 129 is any known gravity or air floatation separator. Alternatively, in some embodiments, the solids/liquid separator 129 dewaters the pH adjusted water and then further treats utilizing a filtration system, such as a multimedia and/or a membrane system pursuant to these technologies' ability to handle high concentration of solids. This solids/liquid separator 129 removes scale forming compounds, such as calcium, barium, and strontium as the carbonate, magnesium as the hydroxide, fluorine as calcium fluoride, and silica as a magnesium silicate species. In additional embodiments, the solids/liquid separator 129 removes total metals to levels below 100 ppb. In further embodiments, the solids/liquid separator 129 removes total transition metals to levels below 0.2 mg/l. In some embodiments, for every 1 mg/l of calcium in the water, 1.18 mg/l of sodium carbonate is added to assist with softening. In further embodiments, for every 1 mg/l of magnesium in the water, 3.29 mg/l of sodium hydroxide is added to assist with removal of magnesium.

Figure 1C:
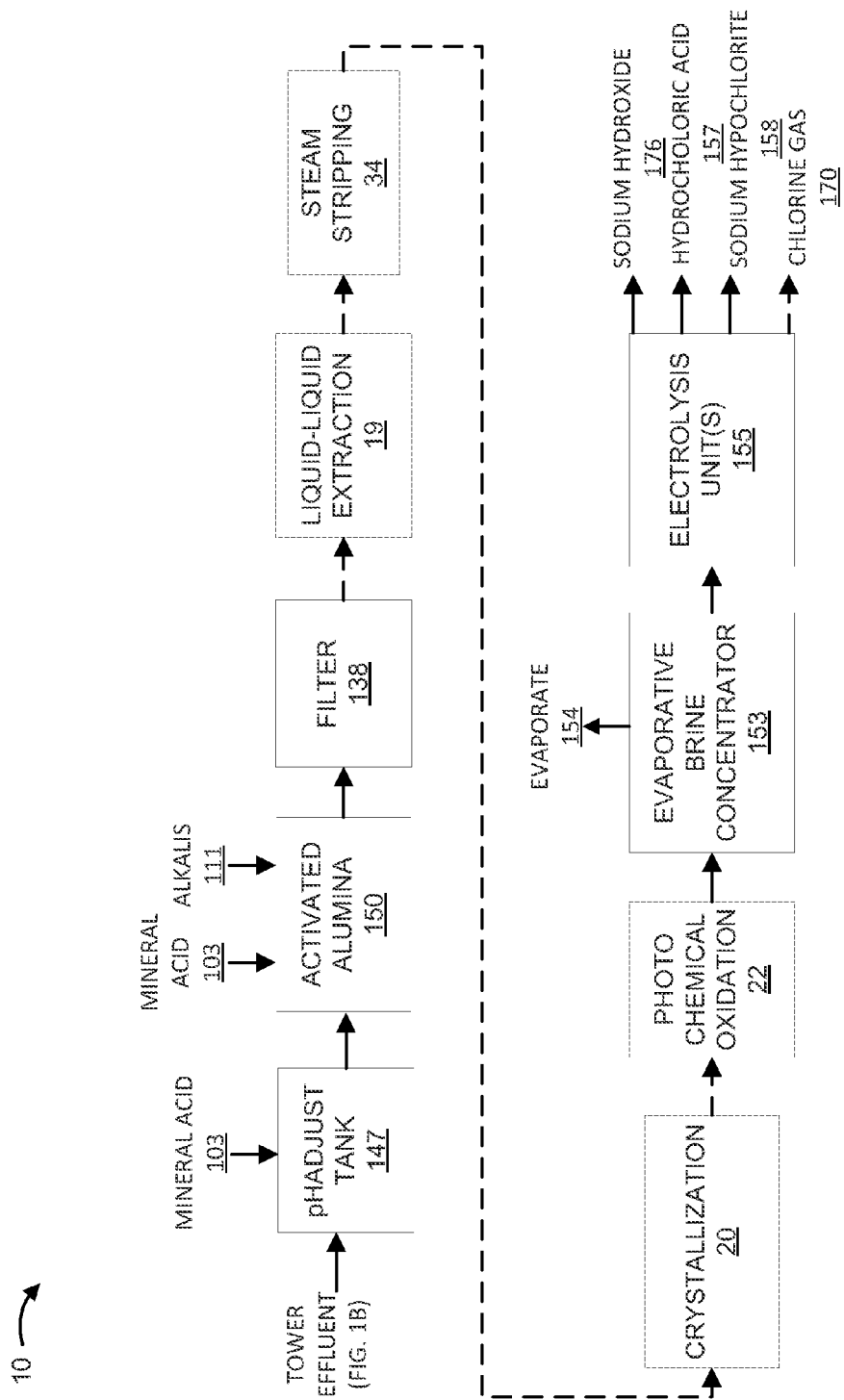
Figure 1D:
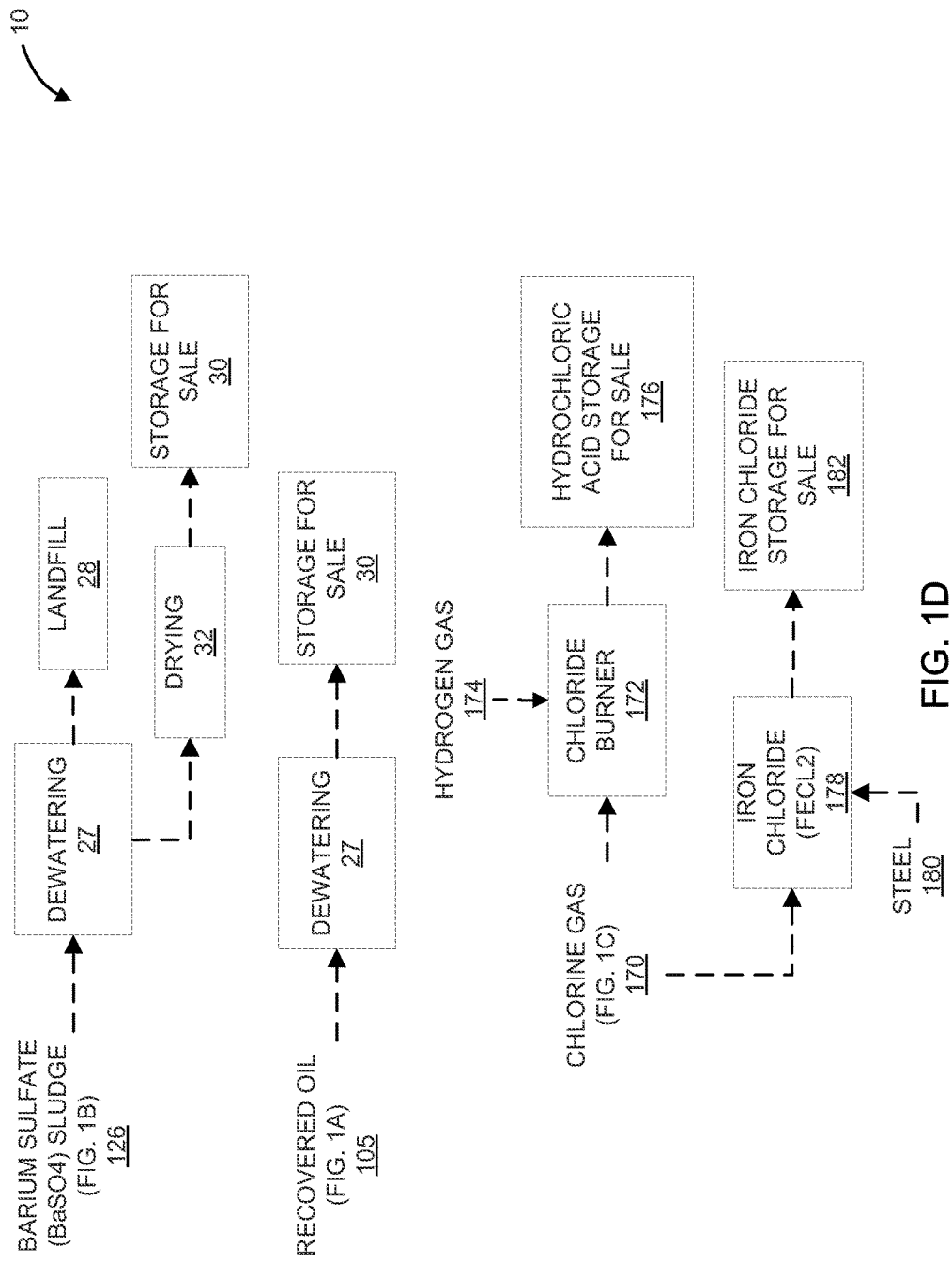
Figure 1E:
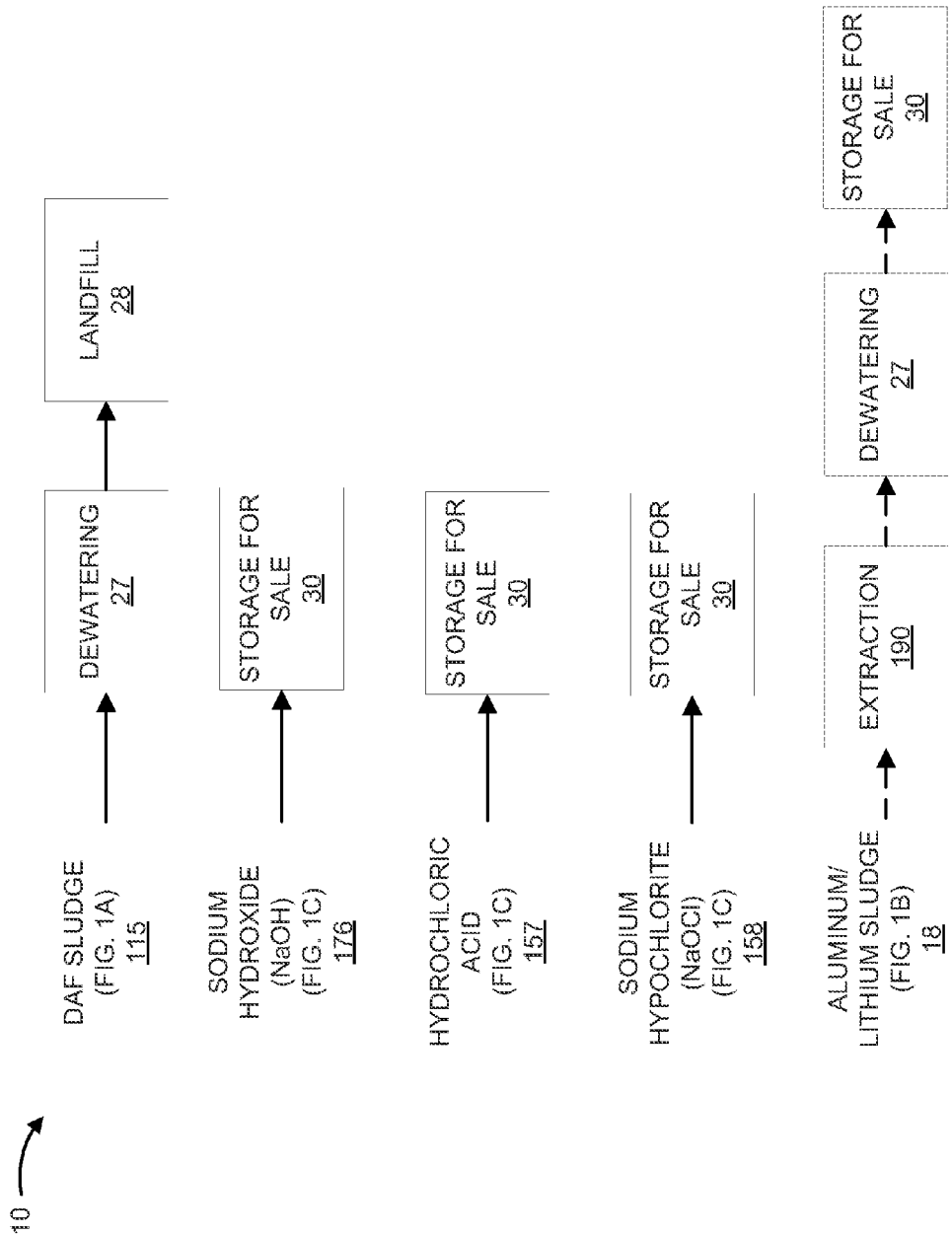
Figure 1F:
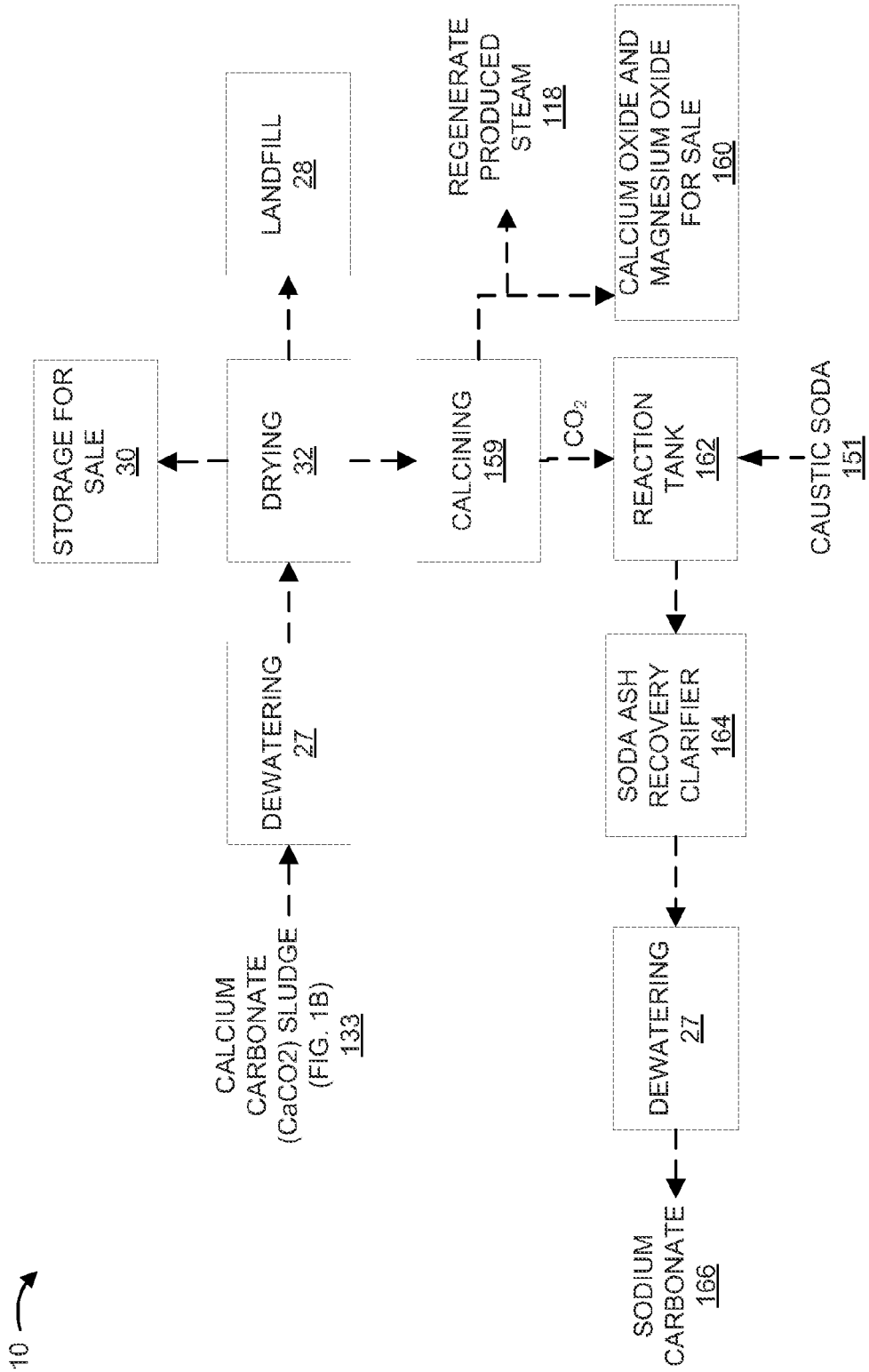

As illustrated in FIG. 1F, the separated solids 133 from solids/liquid separator 129 are dewatered. Any known dewatering systems may be utilized. After dewatering, in some embodiments, the solids 133 are rinsed with water to remove excess sodium chloride. In some embodiments, the solids 133 are suitable for sale. These salable solids may be placed in storage 30 before sale. In some embodiments, the solids 133 are suitable for sale after drying the solid with a dryer 32. For example, the produced solids 133 may be utilized to manufacture quick lime.

In other embodiments, as illustrated in FIG. 1F, the solids 133 after dewatering are calcined in calciner 159 to generate calcium oxide (quicklime) 160. The calcium oxide (or quicklime) 160 may be sold for other uses, such as concrete manufacturing or the neutralization of acid mine drainage or acid gas neutralization in coal fired power plants. If the calciner 159 is utilized, the carbon dioxide gas given off in the calciner 159 may be captured. In some embodiments as illustrated in FIG. 1F, the captured gaseous carbon dioxide is utilized to make sodium carbonate 166 by combining the carbon dioxide gas with caustic soda 156 in a reaction tank 162. This combination causes the sodium carbonate to separate from the water as soda ash in the reaction tank 162. Next, clarifier 164 is utilized to remove the soda ash from the water. The soda ash is subject to a dewater via a suitable dewatering system 27, such as a centrifuge to form sodium carbonate 166. In some embodiments, the utilized caustic soda 156 is caustic soda 156 produced by the downstream electrolysis unit 155. In some embodiments, the sodium carbonate 166 is sent back to pH adjustment tank 127 for use in the softening process as alkalis 111.

The produced/flowback water from the solids/liquid separator 129 is then passed through a weak acid cation (WAC) ion exchange column 139 and a chelating ion exchange column 140. The WAC ion exchange column 139 and the chelating ion exchange column 140 remove calcium, barium, magnesium and strontium to ultra-low levels of less than 50 ppb. Any suitable ion exchange resin may be utilized in the WAC ion exchange column 139 and the chelating ion exchange resin.

The WAC resin has a very high capacity to absorb and exchange divalent ions and is regenerated with both hydrochloric acid 157 and caustic soda 156. The chelating resins are also regenerated with caustic 156 and HCl (hydrochloric acid) 157. In some embodiments the resins are a DOW MAC-3 WAC® and Amberlite IRC7470 as sold by the Dow Chemical Company headquartered at 2030 Dow Center, Midland, Mich. 48674. In some embodiments, the utilized hydrochloric acid 157 and caustic soda 156 are produced by the downstream electrolysis unit 155. In other embodiments the hydrochloric acid 157 and caustic soda 156 are purchased. In some embodiments, the waste produced from regeneration is sent back to the facility influent structure for reprocessing. In other embodiments, the waste produced from regeneration is sent to a batch treatment system for treatment or recycled back to the beginning of system 10.

The produced/flowback water from the WAC ion exchange column 139 and the chelating ion exchange column 140 is brine consisting of mainly sodium chloride. All other ions such as barium, calcium, magnesium, strontium and others have been replaced with sodium in the produced/flowback water from the upstream treatment components, which provide chemical softening followed by ion exchange. The brine from the WAC ion exchange column 139 and the chelating ion exchange column 140 has a resulting TDS that has increased slightly. The TDS is increased because divalent ions have been replaced with 2 monovalent sodium ions. This brine from the WAC ion exchange column 139 and the chelating ion exchange column 140 is sent to another pH adjustment tank 143. The pH of the water is adjusted to between 9.5 and 12.0 using caustic soda 156 or other suitable alkali. As discussed above the caustic soda 156 may be produced from the downstream electrolysis unit 155 or may be purchased.

Unexpectedly, the addition of extra aluminum 121 in the solids/liquid separator 129 caused the aluminum 121 to precipitate out or come out of solution during following downstream pH adjustments. The pH is adjusted from 11.5 to 6.5 because the downstream alumina vessel 150 and the evaporator 153 work better a lower pH. In order to prevent the precipitated aluminum 121 from interfering with and/or fouling downstream components an aluminum removal system was added.

Initially a gravity clarifier was tried to remove the aluminum 121 because aluminum 121 settles. However, the gravity clarifier was unsuccessful in removing the aluminum 121. Upon further investigation it was determined that residual carbonate from the softening step was converting to $CO_2$ when the pH was adjusted from 11.5 to 6.5. When the produced $CO_2$ tries to bubble out of the solution, the resulting $CO_2$ gets trapped in the precipitated aluminum 121 causing the aluminum 121 to float to the surface.

The aluminum 121 removal system includes a pH adjustment tank 134, a floc mix tank 137, and a clarifier 131. The produced/flowback water from the chelating ion exchange column 140 is sent to a pH adjustment tank 134. The pH adjustment tank 134 changes the pH from 11.5 to 6.5.

Next, the pH adjusted water from the pH adjustment tank 134 is sent to a floc mix tank 137 and treated with a flocculant 113. A flocculant 113 may be any suitable flocculant 113 for treating waste water, such as any polyacrylamide based flocculant suitable for use in water or wastewater treatment. In some embodiments, based upon the discovery above, the floc mix tank 137 is filled with sand.

The flocculated water from floc mix tank 137 is sent to a clarifier 131. The clarifier removes the precipitated aluminum 121 from the water from the floc mix tank 137. Based on the $CO_2$ trapping in the aluminum, if no sand is utilized in the floc mix tank 137, then the clarifier 131 is a dissolved air floatation clarifier for removing the aluminum 121. If sand is utilized in the floc mix tank 137, then the clarifier 131 is a gravity clarifier forming a ballasted system for removing the aluminum 121.

In some embodiments, with the aluminum removed, the produced/flowback water from clarifier 131 is further treated to remove lithium. In some embodiments, a precipitant or coagulant 108 is added to the produced/flowback water from aluminum clarifier 131 to affect treatment in a reaction tank 142. Next, water with precipitated lithium and aluminum is then sent to a solids/liquid separator 135. In some embodiments, the precipitated lithium is removed in the solids/liquid separator 135 by gravity clarification and in other embodiments by dissolved air floatation or membrane filtration. The separated lithium and aluminum may be subject to end processing as illustrated in FIG. 1E. For example, lithium may be extracted from the aluminum/lithium sludge 18 with an extraction system 190. After the lithium is extracted, it is dewatered with a dewatering system 27, such as a centrifuge. The recovered lithium may be sold for various applications. For example, lithium is utilized in electronics manufacturing, in battery manufacturing, and in pharmaceuticals. Any suitable method for removing lithium may be utilized in the system 10. In some embodiments, the recovered lithium is placed in storage 30 before sale as illustrated in FIG. 1E.

The produced/flowback water from the solids/liquid separator 135 or from the solids/liquid separator 129 is sent to a pH adjustment tank 136 as illustrated in FIG. 1B. The pH of the produced/flowback water from the solids/liquid separator 135 or from the solids/liquid separator 129 is adjusted to an elevated state with an alkali 111. Any alkali could be used in the pH adjustment tank 136 including caustic soda 156 produced in the downstream electrolysis system. The pH is adjusted to a pH of 10.5 or higher to aid in the removal of ammonia in the downstream membrane system 16 and tower 145. In some embodiments, the downstream membrane system 16 and tower 145 are performed directly after the solids/liquid separator 129 because the pH is of the effluent water from solids/liquid separator 129 is already at 11.5 eliminating the need for pH adjustment tank 136.

While an ammonia stripping tower may be utilized solely to remove a desired amount of ammonia from produced/flowback water, unexpectedly, the size of the ammonia stripping tower needed to effectively remove ammonia from produced/flowback water is extremely large. This large stripping tower requires a significant amount of space and money.

Based on our knowledge, semipermeable membrane systems have never been utilized to remove ammonia from produced/flowback waters. System 10 was implemented with a plurality of membranes of a membrane system 16 designed to allow the transport of ammonium ions across the semipermeable membrane into a cross flowing solution containing 1.0 normal sulfuric acid. An ammonia removal of at least 80% was desired. Surprisingly, in some embodiments, the membranes remove greater than 90% of ammonia from the water. The use of high temperatures and a high pH increase the removal rates of this technology.

Accordingly, the pH adjusted water from the pH adjustment tank 136 of system 10 is passed through one or more membranes of membrane system 16. As discussed above, the membrane system allows the transport of ammonium ions across the semipermeable membrane into a cross flowing solution containing 1.0 normal sulfuric acid. The ammonia in the pH adjusted water reacts with the sulfuric acid 141 to form ammonium sulfate. The ammonium sulfate is concentrated to up to 40% by weight by continuing to recycle the solution past the ammonia contacting membranes. This concentrated ammonium sulfate solution 165 can then be marketed and/or sold as a fertilizer for agricultural purposes. In some embodiments, the semipermeable membranes are Liqui-Cel® membranes as sold by Membrana located at 13800 South Lakes drive, Charlotte, N.C. 28273. As discussed above, in some embodiments, the membranes of membrane system 16 remove greater than 90% of ammonia from the water. For example, produced water containing 100 mg/l of ammonia elevated to a pH of 11.25 and heated to a temperature of 104 degrees Fahrenheit passed through a Liqui-Cel® membrane had an effluent ammonia concentration of 9 mg/l.

Next, if additional ammonia removal is desired, the water from the membrane system 16 is passed through a counter flow ammonia stripping tower 145. For example, the ammonia stripping tower 145 may be utilized if the remaining ammonia concentration is greater than 2 mg/l. The ammonia, which is the predominant nitrogen species in produced water, is removed by contacting a thin film of alkaline water to a high volume of air 146 in the stripping tower 145. The ratio of air to water is variable from 30 cfm to 1 lb of water up to 70 cfm per pound of water and is based upon the ammonia starting concentration and physics of the stripping tower. The air stream 146, containing ammonia is sent to a thermal oxidizer for conversion to nitrogen and discharge into the atmosphere. After both ammonia removal operations (membrane system 16 and tower 145) the water contains less than 1 mg/l ammonia. Alternatively, other suitable ammonia removal systems for system 10 as known by those skilled in the art may be utilized as long as these systems reduce the ammonia levels in the water to less than 1 mg/l of ammonia, such as steam stripping systems 34.

The purified brine/produced/flowback water containing low levels of nitrogen from the ammonia stripping tower 145 is transferred to an additional pH adjustment tank 147. In some embodiments, hydrochloric acid is added to purified brine/produced/flowback water in the pH adjustment tank 147 reduce the pH to a more neutral or slightly alkaline condition. As discussed above, the hydrochloric acid 157 may be acid produced by the downstream electrolysis unit 155 or purchased. The pH adjustment tank 147 adjusts the purified brine/produced/flowback water to a pH range of 8-10.5.

In some embodiments, the activated carbon columns 149 receive the pH adjusted water from pH adjustment tank 147 instead of being located after organics removal system as disclosed above.

The purified brine from the carbon columns 149 or the pH adjusted water from pH adjustment tank 147 passes through a polishing tank 150. The polishing tank 150 removes fluoride using activated alumina. The purified brine from the carbon columns 149 or the pH adjusted water from pH adjustment tank 147 flows through a pressure vessel containing activated alumina in the polishing tank 150. In some embodiments, the fluoride is removed to low levels to meet brine quality specifications, such as the specification shown in Example 1, Example 2, and Example 3 below. The activated alumina can be regenerated with acid 141, such as hydrochloric acid 157 and caustic soda 156. Again, the utilized hydrochloric acid 157 may be produced by the downstream electrolysis unit 155 or may be purchased. The regeneration waste may be sent back to the influent of system 10 for reprocessing or may be batch treated.

Next the polished water from the polishing tank 150 is flowed through a micro or ultrafiltration system 138. In alternative embodiments, the filter system 138 is a ceramic or polymeric system. In other embodiments, the filter system 138 is a media filter. The filter system 138 is selected to be suitable for the corrosion rate of concentrated sodium chloride solutions. The filter system 138 removes colloidal solids, which could be any metalloid species.

Next, the filtered water from the filter system 138 is passed through a second organics removal system. The second organics removal system is designed to remove organic acids and/or alcohols from the filtered water. Unexpectedly, the influent water contained a high amount of organic acid and alcohols that were not removed by the first organics removal system or any following downstream component. The second organics removal system produces water with a TOC goal of 10 mg/l or less.

TOC is a difficult and often nameless or faceless measurement. Two equivalent TOC values could be made up of very different organic components. In some embodiments, the second organics removal system provides for a TOC reduction of about 86.6%. The bulk of the remaining TOC left in the water by the time the water reaches the second organics removal system is made up of organic acids and alcohols. Organic acids and alcohols are often difficult to remove. In some embodiments, the influent water contains alcohols and organic acids at ppm levels. For example, the Optipore resin discussed above does not remove any organic acids or alcohols by reducing TOC even though the Optipore resin operates at above 99% efficiency in the removal of BTEX.

The second organics removal system includes a liquid-liquid extraction system 19, a steam stripping system 34, a crystallization system 20, and/or a photochemical oxidation system 22. While all of these systems are illustrated in FIG. 1C each may be utilized alone or in any combination with one or more of the other systems. Further, while FIG. 1C illustrates a specific order of the liquid to liquid-liquid extraction system 19, steam stripping system 34, the crystallization system 20, and/or the photochemical oxidation system 22 they may utilized in any order desired.

The liquid-liquid extraction system 19 creates a phase transfer from brine to solvent. The liquid-liquid extraction utilizes a unique organic solvent to remove the organic acids and alcohols. In some embodiments, the liquid-liquid extraction system 19 and organic solvent is the liquid-liquid extraction system 19 and organic solvent sold by Koch Modular Process Systems, LLC located at 45 Eisenhower Drive, Suite 350, Paramus, N.J. 07652. In some embodiments, the liquid-liquid extraction equipment of SCHEIBEL® Columns, KARR® Columns, rotating disc contactor (RDC) columns, pulsed, packed (SMVP) and/or a sieve tray are utilized as sold by Koch Modular Process Systems, LLC located at 45 Eisenhower Drive, Suite 350, Paramus, N.J. 07652.

The steam stripping system 34 includes a steam stripper tower and condensate collection system. The steam stripping system 34 utilizes steam stripping to remove the alcohols. Steam stripping, at a high temperature and pressure distills/evaporates the alcohol. The distilled/evaporated alcohol is then captured when the steam is condensed. Any conventional steam condensing system known to those skilled in the art is applicable. In some embodiments, the second organics removal system includes a liquid-liquid extraction system 19 typically followed by the steam stripping system 34. Steam stripping and distillation can also be utilized to remove ammonia. The condensed steam can then be distilled to separate and isolate the alcohols.

The crystallization system 20 includes an evaporator which concentrates the total dissolved solids beyond their solubility limit upon which crystallization occurs. The system would consist of a pH adjustment tank prior to the evaporator to reduce the pH to less than 3. The pH depression is necessary to fully protonate the organic acids. Typically, the organic acids are present initially as the sodium salt such as sodium acetate and have very high boiling points. Once the organic acids are protonated into the acid state, the boiling point decreases to within a range that is economically feasible to achieve. In some embodiments, the organic acids found in the influent water are acetic (boiling point (BP)=118 degrees Celsius), propionic (BP=141 degrees Celsius) and butyric (BP=163.5 degrees Celsius). Without pH depression these organic acids exist as a sodium salt, such as sodium acetate (BP=881.4 degrees Celsius). The crystallized solids, mainly salt are passed thru an oven elevating the temperature above the boiling point of the organic acids. Vapors from this over can be collected and the air purified by a wet scrubber. The overflow from the wet scrubber can be sent to a biological treatment system where the organic acids are converted to carbon dioxide and water. The salt will require reconstitution with water before proceeding to electrolysis.

The photochemical oxidation system 22 utilizes ultraviolet light in the presence of an oxidizer and catalyst to remove the organic acids and alcohols. Photochemical oxidation systems are known in the art. Any suitable photochemical oxidation system 22 may be utilized by the photochemical oxidation system 22 in system 10 for producing water with a TOC of 10 mg/L or less.

The purified brine from second organics removal system is evaporated in the evaporation tank 153 or evaporative brine concentrator 153 as illustrated in FIG. 1C. The evaporator tank 153 further concentrates the TDS in the purified brine to be in a range suited for the electrolysis process, typically about 290,000-310,000 mg/l TDS as sodium chloride. The purified brine from the activated alumina tank 150 supplies the evaporation tank 153 with purified brine reducing both the operational and the technical risk of evaporation technology compared to evaporating produced/flowback water and/or brine that is not as purified as the purified brine of system 10. In some embodiments, the evaporative brine concentrator 153 is a mechanical vapor recompression, a multiple effect with falling film evaporator, or a rising film evaporator. Any suitable evaporative brine concentrator 153 as known to those skilled in the art may be utilized in system 10. In embodiments, the steam in the evaporator tank 153 is condensed through cooling producing high quality distillate 154. The high quality distillate may be used as make-up water for chemical dilution throughout system 10. For example, high quality distillate may be sent to cooling towers, used as boiler feed, or polished and discharged to a publicly owned treatment works (POTW) or a NPDES permit. In other embodiments, some of the high quality distillate may be used to preheat water or regenerate the resin bed 117. In other embodiments, the high purity water is sold.

The concentrated purified brine from the evaporative brine concentrator 153 containing about 290,000 to 310,000 mg/l of sodium chloride enters the electrolysis unit 155 as illustrated in FIG. 1D. The electrolysis unit 155 converts the concentrated purified brine into sodium hydroxide 151, hydrogen 174, and chlorine gas 170 in a membrane cell. In some embodiments, the chlorine gas 170 is combined with the hydrogen 174 in a graphite furnace or chloride burner 172 to convert the two gases into hydrochloric acid 157 as illustrated in FIG. 1D. Additional hydrogen 174 may be added to balance the reaction. In other embodiments, the chlorine gas 170 is exposed to any type of steel, such as virgin grade steel or waste steel and dissolved water in reaction tank 178 as illustrated in FIG. 1D. The HCL dissolves the iron and the HOCl converts ferrous iron to ferric iron to form ferric chloride or iron chloride 182. Once the concentration of ferric chloride reaches an elevated concentration, the ferric will act as an etchant dissolving the iron itself and will become a self-propagating species. Chlorine will still be required to oxidize ferrous chloride to ferric chloride as ferrous chloride does not act as an etchant. In some embodiments, this reaction takes place at an elevated temperature of 125 to 160 degrees Fahrenheit. Alternatively, the sodium hypochlorite 158 can be manufactured by the electrolysis unit 155 instead of hydrochloric acid 157. Any known electrolysis units 155 suitable for purified brine may be utilized in system 10.

The sodium hydroxide 151, hydrochloric acid 157, and/or sodium hypochlorite 158 produced by the electrolysis unit 155 are all high purity products due to the use of high purity brine.

The market for high purity products, such as sodium hydroxide 151, hydrogen 174, sodium hypochlorite 158, and hydrochloric acid 157 is good. For example, in the U.S. approximately 12,131,000 dry tons of sodium hydroxide 151 is utilized annually with a market value of about $400 to $1200 per dry ton. Sodium hydroxide 151 is used in many industries including water treatment, wastewater treatment, metal finishing, pulp & paper as well as textile manufacturing. In an additional example, in the U.S. approximately 5,000,000 dry tons of hydrochloric acid 157 is utilized annually with a market value of about $200 to $400 per dry ton. Over 25% of the hydrochloric acid 157 usage in the U.S. is for well acidizing during hydraulic fracking. In addition, hydrochloric acid 157 is also used in the water treatment and wastewater treatment industries.

Further, in system 10 in some embodiments, a demulsifier may be added to the water prior to the oil/water separator 104. In some embodiments, the organics removal system including tank 147, activated carbon columns 149 and polishing tank 150 are not utilized after the brine purification system and are instead utilized between the one or more equalization tank 106 of the oil removal and recovery system and the coagulation tank 107 of the TSS and Iron removal system. While the ammonia stripping tower 145 is located in a specific position in the brine purification system, in some embodiments, the ammonia removal system is located anywhere after the pH adjustment tank 136. In another alternative embodiment, the WAC ion exchange column 139 and the chelating ion exchange column 140 are located after the evaporative brine concentrator 153 before the electrolysis unit 155 instead of being located after the brine purification system. In some embodiments where caustic 156 is utilized, lime may be utilized instead. In another alternative embodiment, the solids/liquid separators may be a centrifuge, belt press, or filter press. In another alternative embodiment, the soda softening system and the aluminum and lithium removal system illustrated in FIG. 1B are switched in order. In another embodiment, the solids/liquid separator 129 may remove silica in addition to the calcium carbonate and magnesium hydroxide.

Systems located within the system 10 and/or 300, such as "the soda softening system" and "the aluminum removal system," include the main feature component (e.g., solids/liquid separator 129 or aluminum clarifier 131) along with any mix tanks, pH adjustment tanks, and/or heat exchangers that are necessary and/or included to improve the purpose of the main feature component.

Figure 4A:
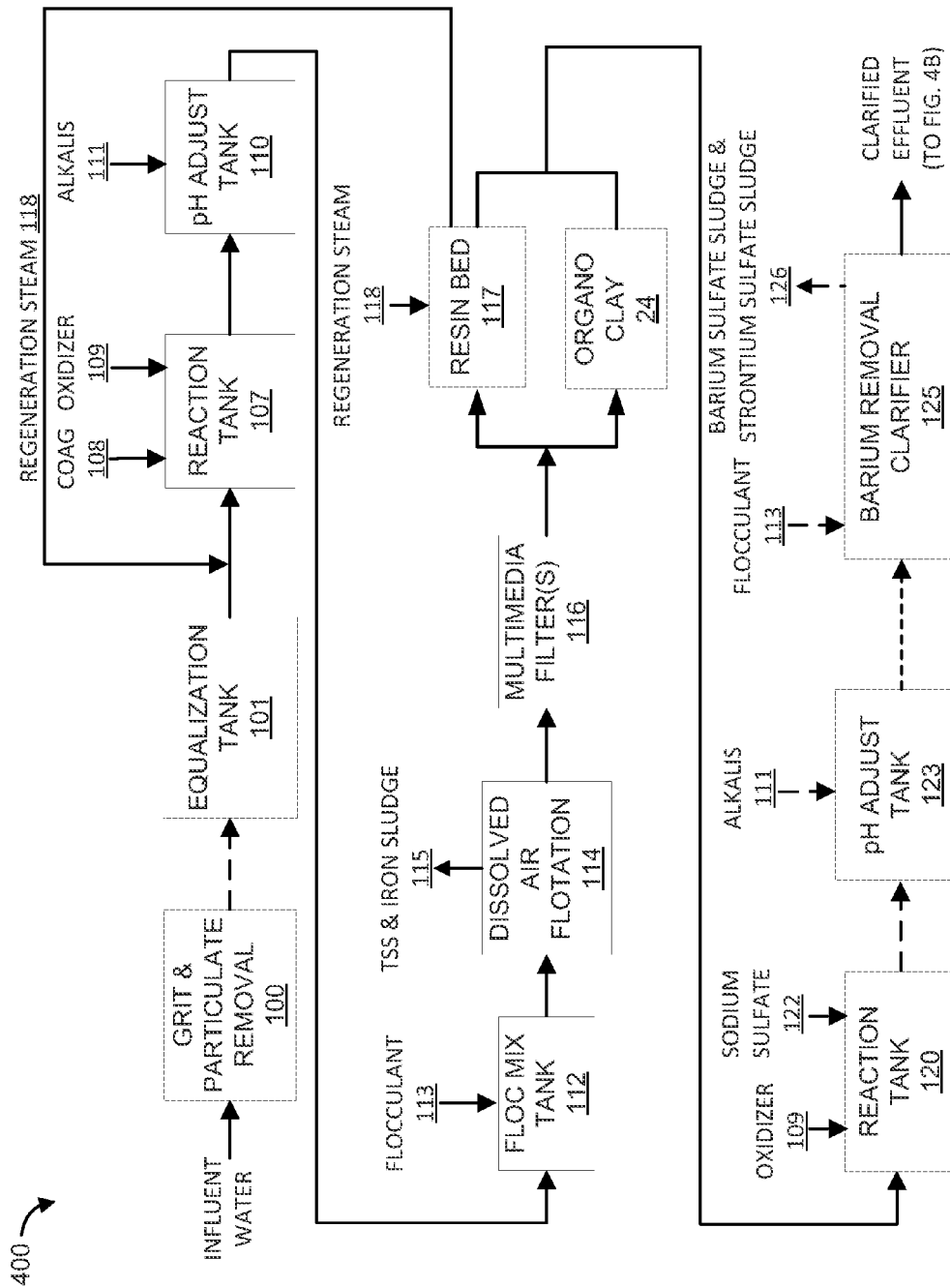
FIGS. 4A-4C illustrate an embodiment of a water treatment system for treating contaminated water to produce sodium hydroxide, hydrochloric acid, and/or sodium hypochlorite from purified brine according to the principles of the present disclosure.
Figure 4B:
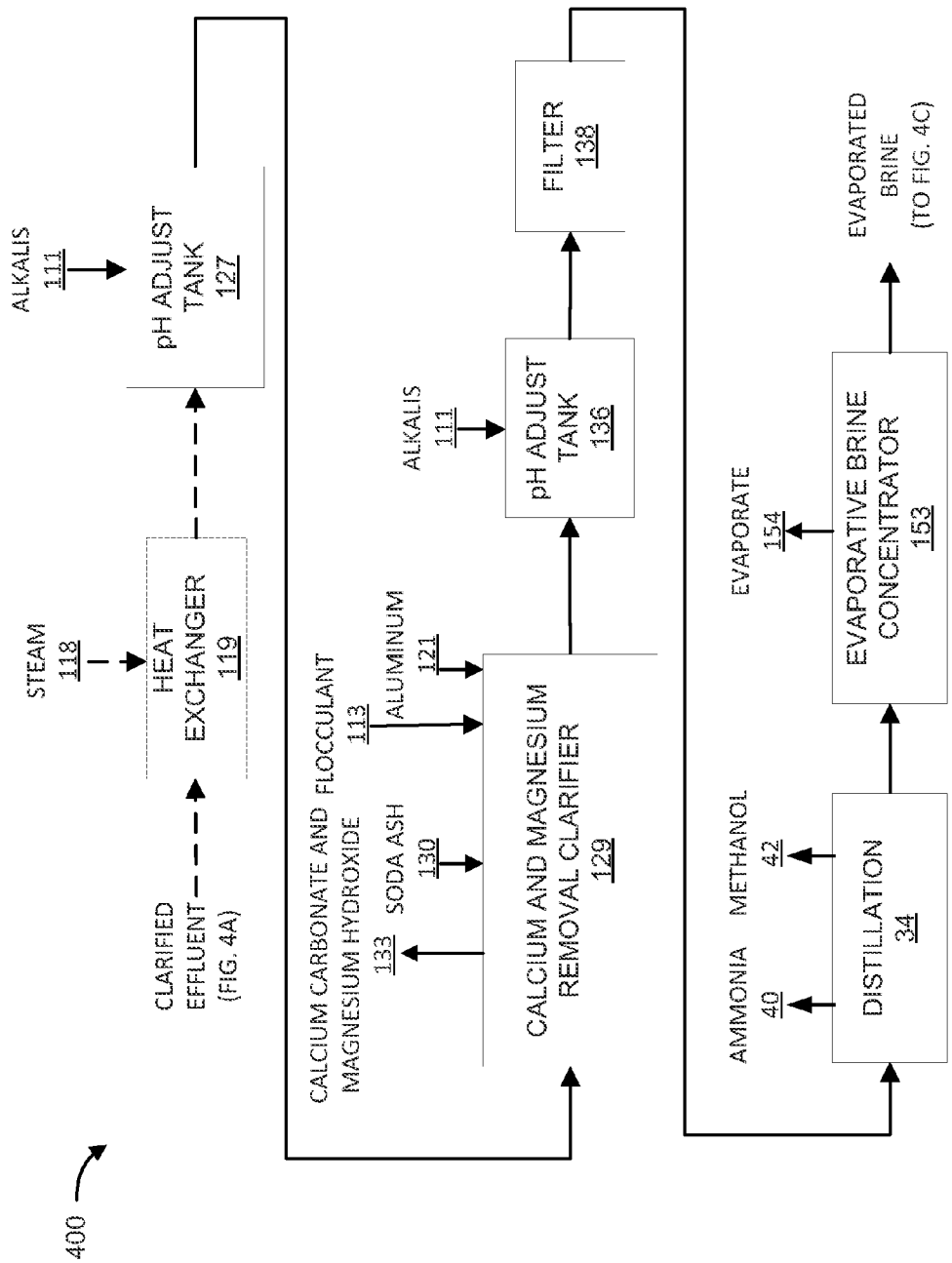
Figure 4C:
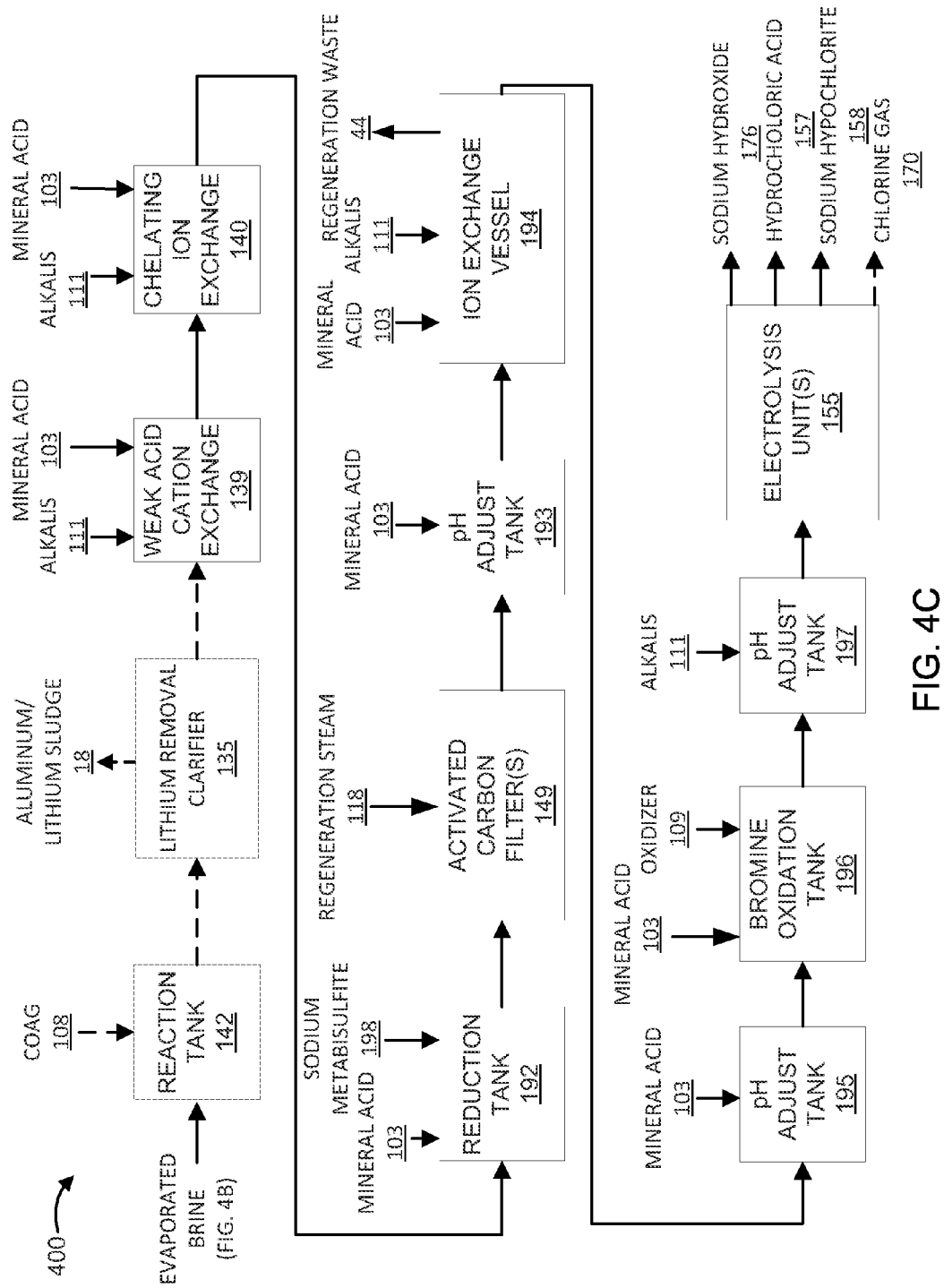

FIGS. 4A-4C illustrate an embodiment of a system 400 for processing produced water. Additionally, FIGS. 4A-4C illustrate an embodiment of a system 400 for producing sodium hydroxide, hydrochloric acid, and/or sodium hypochlorite. System 400 utilizes several of the same components as system 10. However, system 400 utilizes a few additional components, does not utilize a few of the components disclosed in system 10, and reorders some of the components of system 10. The flowback/produced water utilized in system 400 is similar to the flowback/produced water discussed above for system 10. In some embodiments, the influent water is run through system 400 at flow rate of about 5 gallons per minute (gpm). However, any suitable flow rate for the treatment of the influent water to produce sodium hydroxide, hydrochloric acid, and/or sodium hypochlorite may be utilized.

Similar to system 10, system 300 in some embodiments utilizes wastewater screening equipment 100. This screening removes large particulates which may affect the pumping equipment downstream. Any suitable screening method for treating the produced water may be utilized by system 10 and produces screened water.

In some embodiments, the screened water from the wastewater screening equipment 100 or the flowback/produced water is input into one or more surge tanks 101 to form equalized produced/flowback water. The surge tank 101 compensates for flow and concentration variations caused by numerous trucks unloading at any given time.

The flowback/produced water, the screened water or the equalized produced/flowback water is transferred to a coagulation tank 107 where a small amount of oxidizer 109, such as but not limited to hydrogen peroxide, sodium hypochlorite 158, chlorine dioxide, sodium persulfates and permanganates, is added. In some embodiments, sodium hypochlorite 158 is added because sodium hypochlorite 158 is generated in the downstream electrolysis unit 155, such as during start-up and shut down. This coagulation tank 107 oxidizes ferrous iron to ferric iron and sulfides to sulfates. The equalized produced/flowback water from the coagulation tank 107 is also treated with a coagulant 108. The coagulant 108 may be any inorganic coagulant 108 containing iron or aluminum 121. In some embodiments, the coagulant 108 may be organic coagulants such as polyamines and poly-DADMCs.

Coagulated water from the reaction tank or coagulation tank 107 flows into pH adjustment tank 110 where the pH is again adjusted to a pH of 6.5-7.5 using alkalis 111 such as caustic soda 156, potassium hydroxide, sodium carbonate 166, lime, and magnesium hydroxide. In some embodiments, the alkalis 111 is a caustic soda 156 produced by the downstream electrolysis unit 155. In other embodiments, the alkali 111 is a caustic soda 156 that is purchased. In some embodiments, sodium based alkalis 111 are utilized since the use of sodium based alkalis 111 contribute to the conversion back to caustic soda 156 in the downstream electrolysis unit 155.

The pH adjusted water from the pH adjustment tank 110 is then treated with a flocculant 113 in floc mix tank 112. The flocculated produced water from the floc mix tank 112 flows into a solids/liquid separation system 114. In some embodiments, the solids/liquid separation system 114 is a gravity and/or an air floatation system. The solids/liquid separation system 114 removes total suspended solids (TSS) and iron sludge. In some embodiments, the solids/liquid separation system 114 additionally removes a portion of petroleum hydrocarbons from the pH adjusted water. Accordingly, in some embodiments the solids/liquid separation system 114 is the first portion of a first organics removal step or system.

In some embodiments, the flocculated or separated solids 115 from the solids/liquid separation system 114 pass into a filtration system which may consist of a multimedia filter or a membrane system. The separated solids 115 may also be subject to end processing as illustrated in FIG. 1E and discussed in detail above.

The water from the solids/liquid separation system 114 is then sent to a first organics removal system. The first organics removal system includes a filter 116 and at least one of a resin bed 117 and an organo-clay 24. In some embodiments, the first organics removal system additionally includes the solids/liquid separation system 114 as discussed above. The first organics removal system removes petroleum hydrocarbons in the gasoline, diesel, and oil range from the influent water.

The water from the solids/liquid separation system 114 is sent through one or more filters 116. In some embodiments, the filter 116 is a multimedia filter or equivalent. In other embodiments, the filter 116 is a membrane filter, sand filter, and/or bag filter. The filtered water from the filter 116 is then passed through a resin bed 117 and/or an organo-clay 24 where petroleum hydrocarbons are adsorbed. Both of which are discussed in detail above.

In some embodiments, the first organics removal system reduces the TOC from 225 mg/l to 140 mg/l as well as removes of up to 99.98% of BTEX. However, the TOC removal is totally dependent upon the characteristic makeup of the organics in the produced/flowback water.

In some embodiments, the water for the organics removal system is treated to remove barium and strontium. In these embodiments, water for the organics removal system is sent into another reaction tank 120. Sulfuric acid 141 and/or sodium sulfate 122 are added to the reaction tank 120 at or near a stoichiometric amount to precipitate barium and/or strontium. In some embodiments, the sulfuric acid 141 and/or sodium sulfate 122 are added to the reaction tank 120 at or near a stoichiometric amount to precipitate out additional or remaining strontium as sulfates in addition to the barium and strontium. In some embodiments, sodium sulfate 122 is utilized because sodium sulfate 122 produces lower barium residual and does not require vast amounts of caustic soda 156 for neutralization when compared to other precipitating reagents like sulfuric acid.

In embodiments, where barium and/or strontium is removed from the influent water, the water from reaction tank 120 then flows into another pH adjustment tank 123 where caustic soda 156 or other alkalis 111 such as magnesium hydroxide, calcium hydroxide, and/or potassium hydroxide are added to raise the pH to a neutral level. In some embodiments, every 1 mg/l Barium in the water requires the addition of 1.034 mg/k sodium sulfate or 0.714 mg/l sulfuric acid. In some embodiments, the pH adjustment tank 123 and the reaction tank 120 are the same tank.

This pH adjustment is beneficial for following solids/liquid separation steps, such as flocculation. In some embodiments, the alkalis 111 are sodium based alkalis since sodium alkalis eventually convert to caustic soda 156 during downstream electrolysis by the electrolysis unit 155. In some embodiments, the caustic soda 156 is the caustic soda 156 produced by the downstream electrolysis unit 155. In other embodiments, the caustic soda 156 is purchased.

In embodiments where barium and/or strontium are removed from the influent water, the pH adjusted water from the pH adjustment tank 123 flows into a solids/liquid separator 125 as illustrated in FIG. 4B. In other embodiments, barium and/or strontium are not removed during treatment system 400. A flocculant 113 is added to the pH adjusted water in the solids/liquid separator 125. In some embodiments, the solids/liquid separator 125 is a gravity clarifier or an air floatation clarifier. In some embodiments, when hydrogen peroxide is utilized, the solids/liquid separator 125 is a dissolved air floatation clarifier.

The solids/liquid separator 125 removes precipitated barium and precipitated strontium out of the water as barium sulfates and, in some embodiments, removes precipitated strontium out of the water as strontium sulfates. The separated solids 126 may then be subjected to end processing as illustrated in FIG. 1D.

The water with reduced petroleum hydrocarbons from the resin bed 117 and/or the organo-clay 24, the water from the solids/liquid separator 125, or the water from the heat exchanger 119 then flows into another pH adjust tank 127 to initiate a softening process. While the embodiments below are an example of a precipitate softening process, other methods of precipitate softening may be implemented by those skilled in the art. In the pH adjustment tank 127 of system 400, the pH is adjusted to about 10.5-12.5. In some embodiments, sodium hydroxides is the alkalis reagent 128 utilized to adjust the pH of the clarified produce/flowback water. In alternative embodiments, other reagents 128 or a combination thereof are utilized to adjust the pH, such as calcium oxide/hydroxide and potassium hydroxide. In further embodiments, magnesium sulfate may be added to tank 127 to assist in the removal of silica. In other embodiments, the reagent 128 is a caustic soda 156 generated by the electrolysis unit 155 during downstream processing. In some embodiments, the reagent 128 is purchased.

Once the pH adjustment is completed, the pH adjusted water from the pH adjustment tank 127 flows into another solids/liquid separator 129 as illustrated in FIG. 4B of system 400. Soda ash 130 or some form of carbonate or carbon dioxide gas is added to the solids/liquid separator 129 at or near a stoichiometric amount to precipitate the calcium, barium, strontium, and other contaminants, typically as their carbonate or hydroxide forms. Alternatively, soda ash 130 may be added in tank 127 prior to the addition of caustic 156 or other alkali 111. A coagulant 108 of aluminum 121 or iron is added to the solids/liquid separator 129 to promote particle growth.

After the addition of the coagulant 108, a flocculant 113 is added to the solids/liquid separator 129. In some embodiments, the solids/liquid separator 129 is any known gravity or air floatation separator. Alternatively, in some embodiments, the solids/liquid separator 129 dewaters the pH adjusted water and then further treats it utilizing a filtration system, such as a multimedia and/or a membrane system pursuant to these technologies' ability to handle high concentration of solids. This solids/liquid separator 129 removes scale forming compounds, such as calcium, barium, and strontium as the carbonate, magnesium as the hydroxide, fluorine as calcium fluoride, and silica as a magnesium silicate species. In some embodiments, the solids/liquid separator 129 removes total metals to levels below 100 ppb. In further embodiments, the solids/liquid separator 129 removes total metals to levels below 0.2 mg/l. Further, in some embodiments, solids/liquid separator 129 reduces the hardness of the influent water to less than 0.02 mg/l (as the sum of calcium and magnesium). In some embodiments, for every 1 mg/l of calcium in the water, 1.18 mg/l of sodium carbonate is added to assist with softening. In further embodiments, for every 1 mg/l of magnesium in the water, 3.29 mg/l of sodium hydroxide is added to assist with removal of magnesium. As illustrated in FIG. 1F and as described above, the separated solids 133 (i.e., the calcium carbonate sludge) may be further processed.

The produced/flowback water from the solids/liquid separator 129 is sent to a pH adjustment tank 136 as illustrated in FIG. 4B. The pH of the produced/flowback water from the solids/liquid separator 135 or from the solids/liquid separator 129 is adjusted to an elevated state with an alkali 111. Any alkali 111 could be used in the pH adjustment tank 136 including caustic soda 156 produced in the downstream electrolysis system. The effluent leaving the pH adjustment tank 136 will have a pH of at least 10.5 to aid in the removal of ammonia in the downstream operations.

Next the pH adjusted water from the pH adjustment tank 136 is flowed through a micro or ultrafiltration system 138. In alternative embodiments, the filter system 138 is a ceramic or polymeric system. In other embodiments, the filter system 138 is a media filter. The filter system 138 is selected to be suitable for the corrosion rate of concentrated sodium chloride solutions. The filter system 138 removes colloidal solids, which could be any metalloid species.

Next, the filtered water from the filter system 138 is passed through a second organics removal system. Unexpectedly, the filtered water contained a high amount of alcohols that were not removed by the first organics removal system or any following downstream component. Accordingly, the second organics removal system is designed to remove at least a portion of the alcohols from the filtered water.

TOC is a difficult and often nameless or faceless measurement. Two equivalent TOC values could be made up of very different organic components. In some embodiments, the second organics removal system provides for a TOC reduction of about 40%. The bulk of the remaining TOC left in the water by the time the water reaches the second organics removal system is made up of organic acids and alcohols. Organic acids and alcohols are often difficult to remove. In some embodiments, the influent water contains alcohols and organic acids at ppm levels. For example, the Optipore resin discussed above does not remove any organic acids or alcohols by reducing TOC even though the Optipore resin operates at above 99% efficiency in the removal of BTEX. In some embodiments, the influent water has a TOC content of from 30 mg/l to well over several thousand mg/l. Excess TOC in the water can cause foaming within the electrolysis cell. This foaming can dry out the membrane in the electrolysis cell causing premature membrane failure. The foaming has also been identified as decreasing electrical efficiency of the cell. Both membrane fouling and decreased electrical efficiency have economic impacts. Accordingly, the TOC in the brine going into the electrolysis cell needs to be less than 10 mg/l.

The second organics removal system of system 400 includes a steam stripping 34 or distillation system 34. The distillation system 34 includes a steam stripper tower and condensate collection system. The distillation system 34 utilizes steam stripping to remove the alcohol and ammonia. Steam stripping at a high temperature distills/evaporates the alcohol and ammonia. The distilled/evaporated alcohol and ammonia is then captured when the steam is condensed. Any conventional steam condensing system known to those skilled in the art is applicable. Steam stripping can also be utilized to remove ammonia. In some embodiments, the condensed steam can then be distilled to separate and isolate the alcohols.

Next, the purified brine from second organics removal system is evaporated in the evaporation tank 153 or evaporative brine concentrator 153 as illustrated in FIG. 4B. The evaporator tank 153 further concentrates the total dissolved solids (TDS) in the purified brine to be in a range suited for the electrolysis process, typically about 290,000-310,000 mg/l TDS as sodium chloride.

In system 300, in some embodiments, the evaporated brine from the evaporation tank 153 is sent to a lithium removal system and then to a WAC ion exchange column 139. In other embodiments, the evaporated brine from the evaporation tank 153 is sent directly to the WAC ion exchange column 139.

The lithium removal system includes reaction tank 142 and solids/liquid separator 135. The reaction tank 142 adjusts the pH of the evaporated brine to a pH of about 8 to 8.5. Next, a precipitant or coagulant 108, such as an aluminum salt, is added to the pH adjusted water in the reaction tank 142. For example, the aluminum salt may be an aluminum chloride or an aluminum chlorohydrate. In some embodiments, for every 1 mg/l of lithium 3.89 mg/l of aluminum salt is added to the reaction tank 142. The added precipitant or coagulant 108 precipitates the lithium from the evaporated brine. In other embodiments, the lithium is removed from the concentrated brine using electrocoagulation with aluminum electrodes. Next, water with precipitated lithium and aluminum is then sent to a solids/liquid separator 135. In some embodiments, the precipitated lithium is removed in the solids/liquid separator 135 by gravity clarification and in other embodiments by dissolved air floatation or membrane filtration.

The separated lithium and aluminum may be subject to end processing as illustrated in FIG. 1E. For example, the aluminum/lithium sludge 18 removed by the solids/liquid separator 135 is sent to an extractor 190. The extractor 190 rinses the aluminum/lithium sludge 18 using a weakly acidic and/or hot water. In some embodiments, the weak acidic water has a pH from about 5 to about 7. In some embodiments, the hot water has temperature of about 60 to 70 degrees Celsius. The lithium is removed with rinse solution leaving a hydrated aluminum oxide. In some embodiments, the hydrated aluminum oxide is utilized as the aluminum salt in the reaction tank 142. Next, the lithium containing rinse water is concentrated by dewatering system 27 to produce a concentrated rinse solution. In some embodiments, the dewatering system 27 is an evaporator and concentrates the lithium containing rinse water with evaporation. Lithium is precipitated as pure lithium carbonate for storage/sale 30 by adding sodium carbonate 130 to the concentrated rinse solution from the dewatering system 27.

The water passed through the WAC ion exchange column 139 is then passed through a chelating ion exchange column 140. The WAC ion exchange column 139 and the chelating ion exchange column 140 remove calcium, barium, magnesium and strontium to ultra-low levels of less than 50 ppb. Any suitable ion exchange resin may be utilized in the WAC ion exchange column 139 and the chelating ion exchange resin.

The produced/flowback water from the WAC ion exchange column 139 and the chelating ion exchange column 140 is a brine consisting of mainly sodium chloride. All other ions such as barium, calcium, magnesium, strontium and others have been replaced with sodium in the produced/flowback water from the upstream treatment components, which provide chemical softening followed by ion exchange. The brine from the WAC ion exchange column 139 and the chelating ion exchange column 140 has a resulting TDS that has increased slightly. The TDS is increased because divalent ions have been replaced with 2 monovalent sodium ions. This brine from the WAC ion exchange column 139 and the chelating ion exchange column 140 is sent to a third organics removal system.

Unexpectedly, water from the chelating ion exchange column 140 contained a high amount of organic acid that was not removed by the first and second organics removal system or any following downstream component. The organic acids include acids such as acetic acid, propionic acid, and butyric acid. One or more activated carbon columns 149 were utilized in an attempt to remove at least a portion of the remaining organic acid. Based on the current art, this was expected to work with minor adjustment. However, after numerous experiments with different types of activated carbon columns at different known pHs, the desired amount of organic acid was not being removed. For example, conventional anthracite activated carbon did not remove the desired amount of organic acids. Moving beyond the known technology and utilized parameters, more experiments were performed in an attempt to get the desired removal rate with one or more activated carbon columns. For example, different types of activated carbons columns were utilized to treat water at various different pHs outside of known and/or accepted ranges. Unexpectedly, a specific combination of activated carbon made from coconut shells at a specific significantly depressed pH (less than a pH of 2) worked to remove the desired amount of organic acid from the influent water.

Accordingly, the third organics removal system includes a reduction tank 192 and activated carbon columns 149. The third organics removal system produces water with a TOC goal of 10 mg/l or less.

The reduction tank 192 is utilized to serve two purposes: reduction; and pH depression. The reduction tank 192 produces a reduced effluent. The reduction tank 192 with the addition of mineral acid 103, as discussed above, depresses the pH of the water from the chelating ion exchange column 140 to a pH of less than 2. In some embodiments, the mineral acid utilized is hydrochloric acid 157.

Additionally, the reduction tank 192 of system 300 is utilized to add inorganic sulfite or phosphite species 198 to the water from the chelating ion exchange column 140. The addition of an inorganic sulfite or phosphite species 198 to the water from the chelating ion exchange column 140 allows the removal of iodate and bromate species in the downstream bromine oxidation tank 196. In produced water brines, iodine exists as iodate and iodide, and bromine exists as bromate and iodate. Iodine species need to be removed due to the fact that they directly damage the electrodes in the electrolysis cell of the downstream electrolysis unit 155. Bromine species need to be removed as they are an undesirable contaminate in the finished electrolysis product, sodium hypochlorite. The presence of bromine species in sodium hypochlorite limits the marketing of that product into the drinking water treatment market (the largest market for that product). Bromate and iodate are converted to bromide and iodide through chemical oxidation/reduction conducted under acidic conditions. The reducing agent can be any inorganic sulfite or phosphite species 198 known to those in the industry to function as reducing agents. Chemicals such as sodium sulfite, sodium bisulfite, sodium metabisulfite and sodium thiosulfate can be used interchangeably in the reduction tank 192. As discussed above the removal of bromide and iodide occurs downstream in the bromine oxidation tank 196.

The pH depressed water or the reduced effluent from the reduction tank 192 is then sent to the one or more activated carbon columns 149. As discussed above, the activated carbon columns 149 contain carbon made from coconut shells. The one or more activated carbon columns 149 polish and/or remove at least a portion of the organic acids and trace contaminants, such as iodine and some metals from the influent water. In some embodiments, depending on the influent concentration of iodine, activated carbon may be used to recover and recycle the iodine for resale. Additionally, the activated carbon columns 149 made from coconut shells can be regenerated onsite using steam. The ability to regenerate the filters and to regenerate them onsite was an unexpected advantage that came from the use of activated carbon columns 149 made from coconut shells.

The water from the third organics removal system then flows into another pH adjust tank 193 whereby the pH is depressed to less than about 4. In some embodiments the mineral acid 103 is hydrochloric or sulfuric acid 141. The pH reduction accentuates the removal of trace metals in downstream equipment.

The pH adjusted concentrated purified brine from the pH adjust tank 193 is then sent through an ion exchange vessel 194. The ion exchange vessel 194 consists of running the pH adjusted concentrated purified brine through a chelating ion exchange column to remove trace metals such as calcium, magnesium and iron that may have been present in the activated carbon step and that may have dissolved from the carbon into the brine. The ion exchange resin exchanges those ions and others for sodium ions and can be operated at any pH from a pH of 2 to a pH of 12 depending upon which metals are present. The ion exchange resin has a finite capacity to absorb other ions and once that capacity has been reached the resin must be regenerated first by passing solutions of mineral acids (HCl or sulfuric) through the resin. The acid proton displaces the absorbed metals on the resin. The resin is then rinsed with pure water and then a solution of a strong alkali such as sodium hydroxide or potassium hydroxide is passed through the resin bed. The sodium and/or potassium ions displace the acid protons and complete the regeneration step. This step is followed again by rinsing and the resin bed of the ion exchange vessel 194 is then placed back into service. This regeneration step may be performed any suitable number of times.

Both the chelating ion exchange column 140 and the ion exchange vessel 194 require the addition of alkalis 111 and mineral acid 103. Any suitable mineral acid 103 as discussed above may be utilized in vessels 194, except nitric acid. Further, any suitable alkali 111, such as sodium hydroxide or potassium hydroxide, may be utilized in vessels 194.

The water from the third organics removal system then flows into another pH adjust tank 195 whereby the pH is depressed to about 3 or less using a mineral acid 103. The pH reduction accentuates the removal of bromine and iodine in downstream equipment.

The pH adjusted polished brine from the pH adjust tank 195 flows into a bromine oxidation tank 196. The bromine oxidation tank 196 oxidizes bromine and iodine. An oxidizer 109 and mineral acid 103 are added to the bromine oxidation tank 196. The oxidizer turns the bromine and iodine into gaseous elemental bromine and iodine gas. In some embodiments, the oxidizer 109 is the chlorine generated in the electrolysis unit(s) 155. The mineral acid 103 is utilized to depress the pH to less than 2.0. The oxidation reaction occurs at elevated temperatures up to 100 degrees Celsius and at pH of less than 2.0. The oxidized solution is passed into the top of an air stripping tower whereby air or steam is blown countercurrent to the downward spraying of the solution. The stripping tower is filled with media with significant surface area whereby the water forms a monomolecular layer and allows the gaseous bromine and iodine to be transferred into the air stream. The air stream exits the stripping tower laden with chlorine, bromine and iodine.

In some embodiments, the air stream exiting the stripping tower is reclaimed using a wet chemical scrubber. The wet chemical scrubber uses a similar mechanism to spray an alkaline solution (e.g., sodium hydroxide) counter-flow to the airstream containing the bromine, iodine and chlorine. The gases react with the alkaline solution to form chlorates, chlorides, bromates, bromides, iodates and iodides. This caustic solution can then be reclaimed and sold to manufacturers of bromine based biocides and flame retardants.

The water from the bromine oxidation tank 196 flows into another pH adjust tank 197 whereby the pH is adjusted to about 6 or higher using alkalis 111. In some embodiments, the alkalis are sodium hydroxide. In some embodiments, the pH adjust tank 197 adjusts the pH from about 6 to 11. The adjusted pH accentuates electrolysis of the water in downstream equipment and varies based on the influent water and electrolysis unit.

In some embodiments, the pH increased brine from the pH adjust tank 197 contains about 290,000 to 310,000 mg/l of sodium chloride as it enters the electrolysis unit 155 as illustrated in FIG. 4C. The electrolysis unit 155 converts the concentrated purified brine into sodium hydroxide 151, hydrogen 174, and chlorine gas 170 in a membrane cell. In some embodiments, the chlorine gas 170 is further processed as discussed above and as illustrated in FIG. 1D. Alternatively, the sodium hypochlorite 158 can be manufactured by the electrolysis unit 155 instead of hydrochloric acid 157. Any known electrolysis units 155 suitable for purified brine may be utilized in system 400.

The sodium hydroxide 151, hydrochloric acid 157, and/or sodium hypochlorite 158 produced by the electrolysis unit 155 are all high purity products due to the use of high purity brine.

Figure 3A:
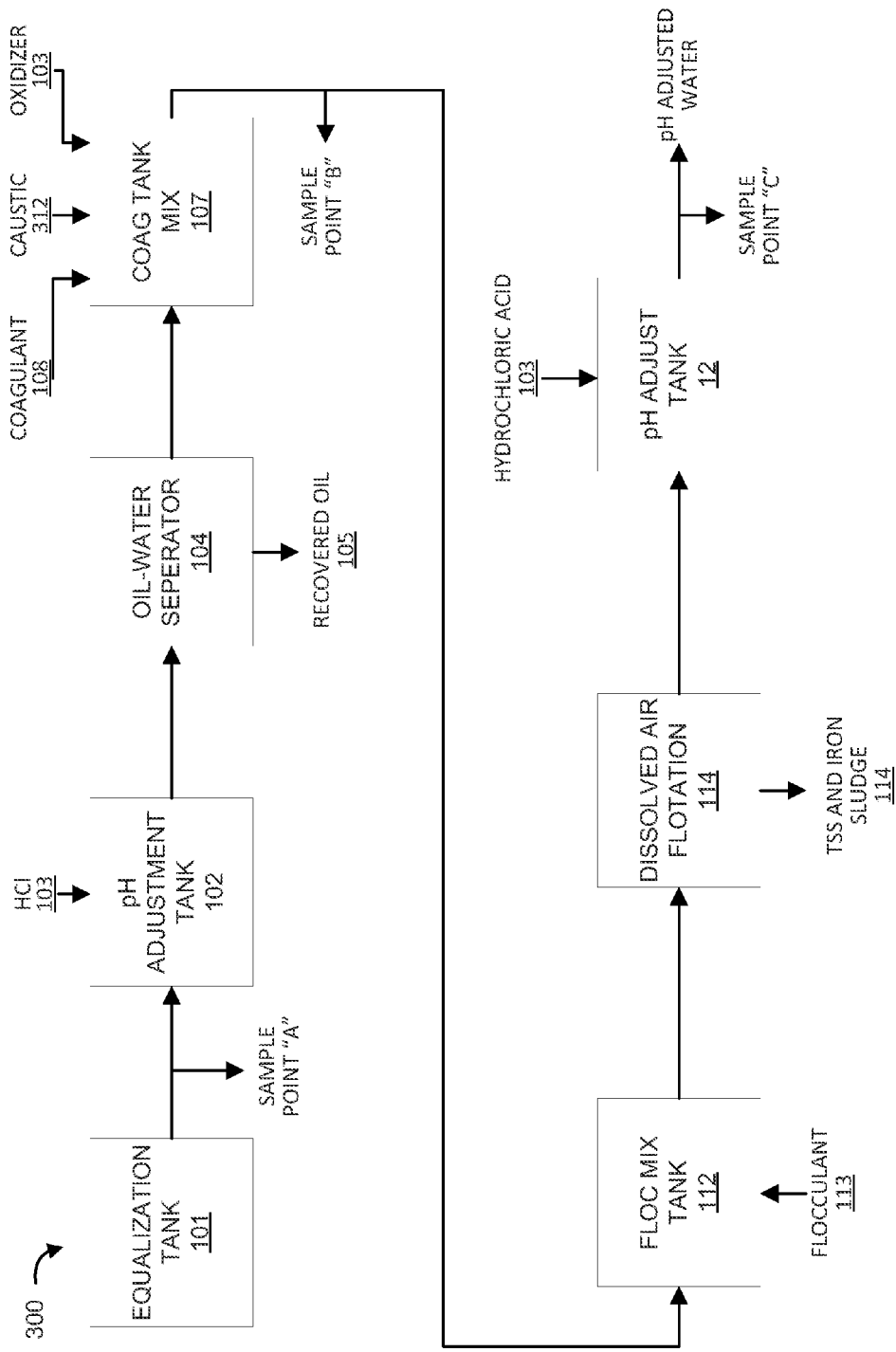
FIGS. 3A-3D illustrates an embodiment of a water treatment system for treating contaminated water to produce sodium hydroxide, hydrochloric acid, and/or sodium hypochlorite from purified brine according to the principles of the present disclosure.
Figure 3B:
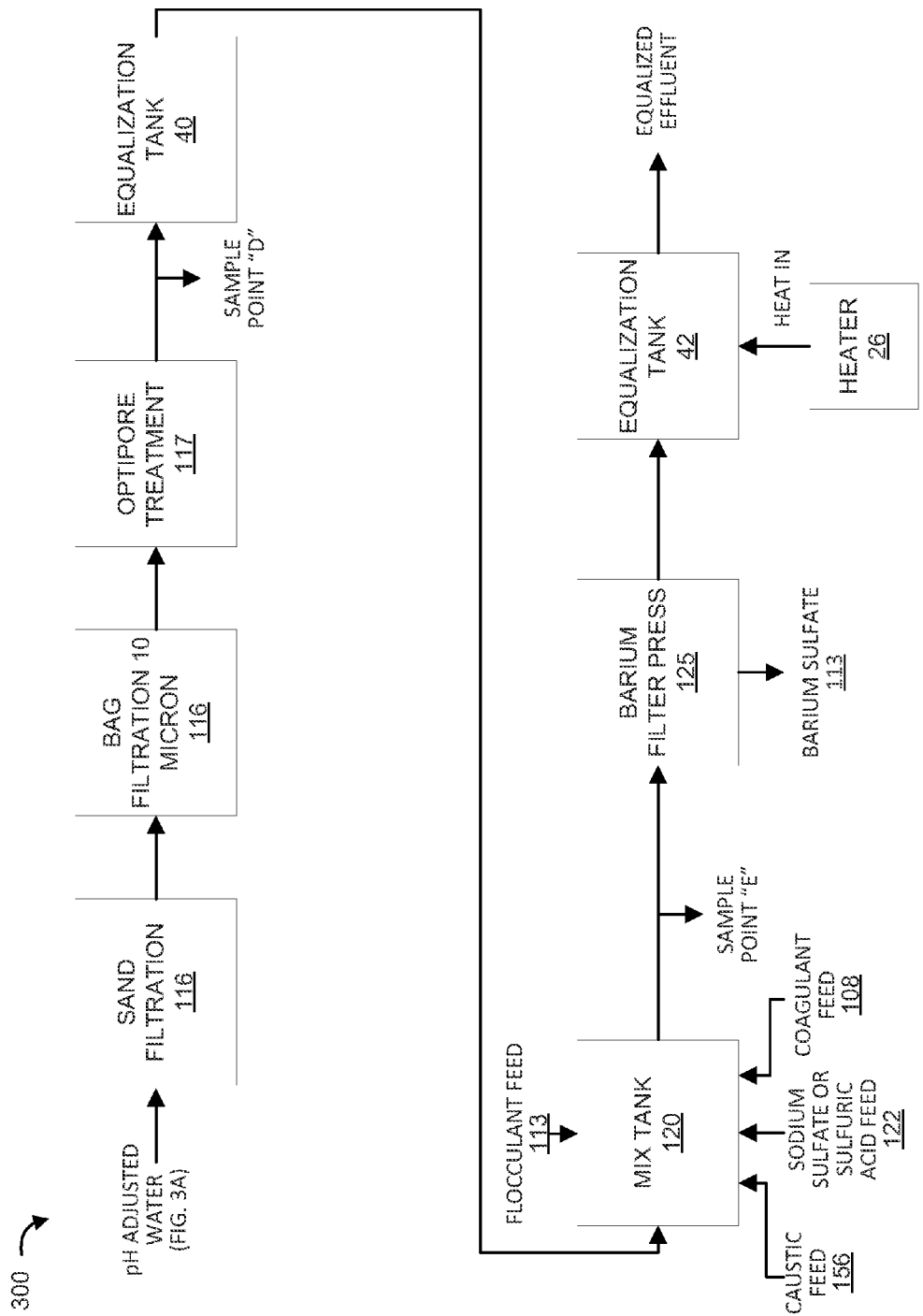
Figure 3C:
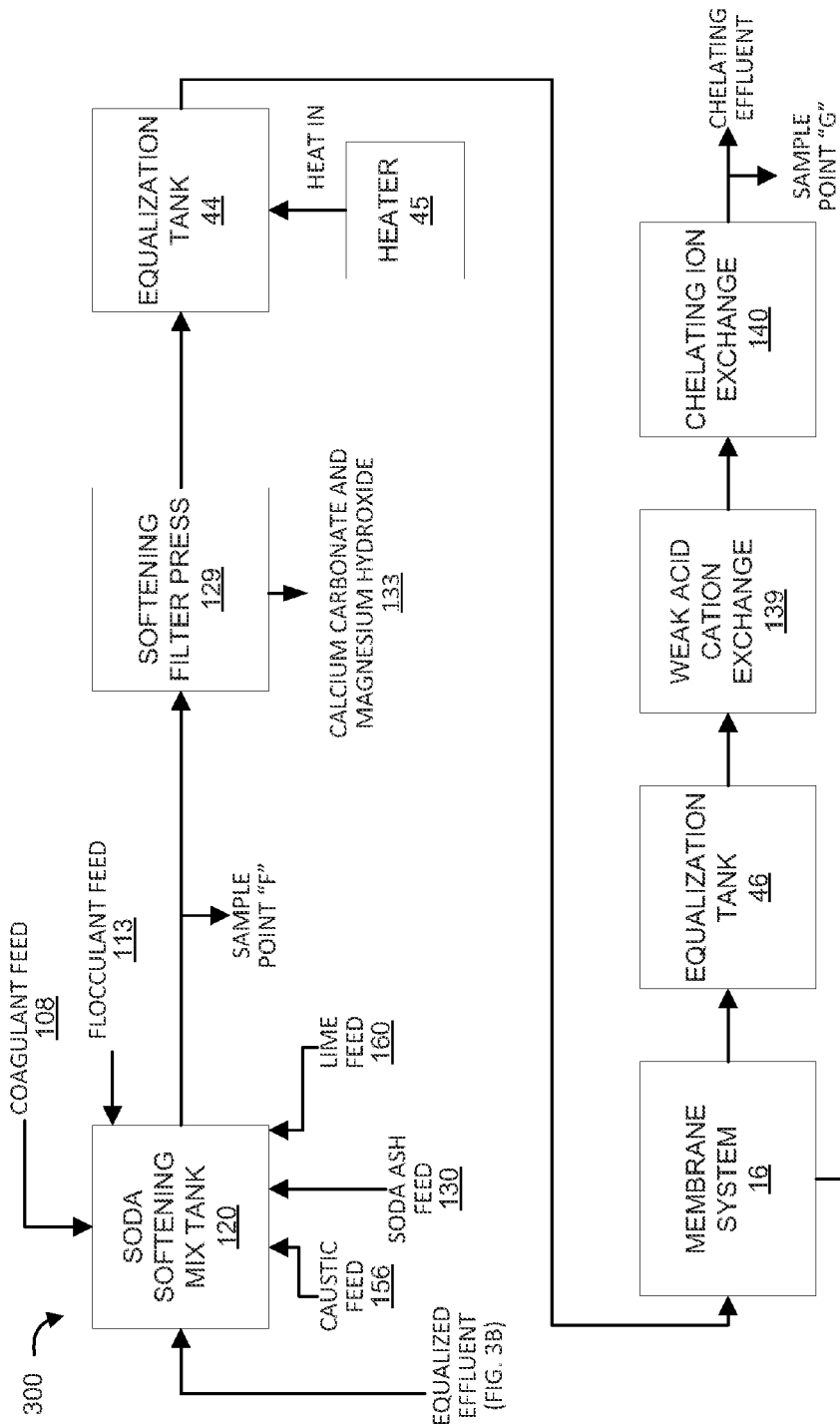
Figure 3D:
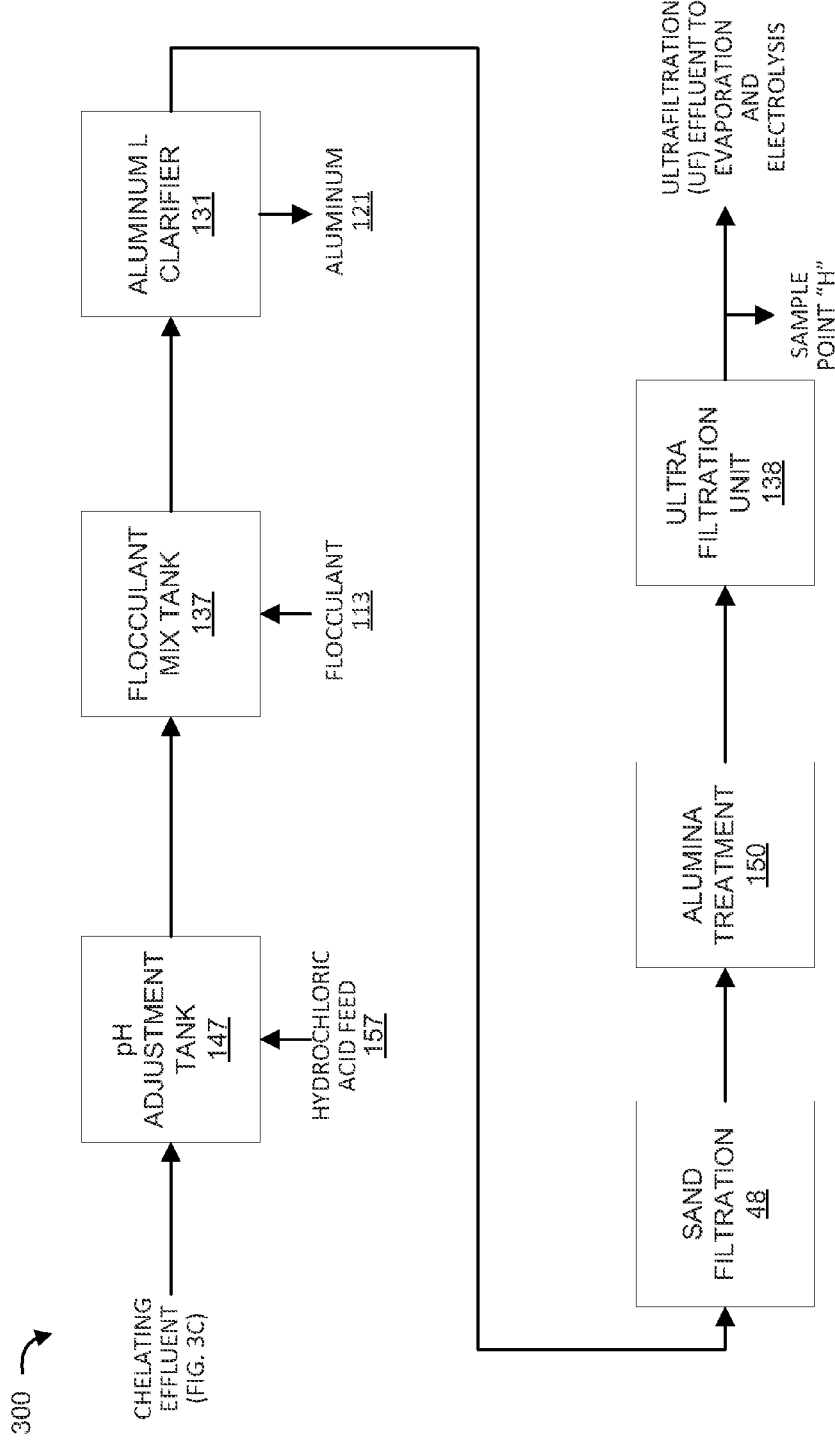

System 400 utilizes a first, second, and third organics removal systems. While these three steps are shown in a specific order, these systems may be utilized in any order to treat the influent water. However, utilizing the first organics removal system followed by the second organics removal system, as shown in system 400 in FIGS. 3A and 3B, provides for the removal of pure methanol.

The system 10 illustrated in FIGS. 1A-1G and/or the system 400 in FIGS. 4A-4C show the treatment of influent water, which is contaminated produced water, to obtain a purified brine suitable for electrolysis, to produce barium sulfate, calcium carbonate, petroleum hydrocarbons 105, and/or lithium. The purified brine is utilized in electrolysis to manufacture caustic soda 156 and hydrochloric acid 157, as well as those compounds listed above, at purities that allow these materials to be sold to consumers for various applications. Further, the system 10 illustrated in FIGS. 1A-1F and/or the system 400 in FIGS. 4A-4C show the recovery of products added during the contaminated water treatment steps at purities that allows these recovered products to be utilized in the treatment of additional contaminated water or sold for other uses, such as carbon dioxide, calcium oxide, chlorine, magnesium oxide, lithium, barium sulfate, hydrogen gas 174, chlorine gas 170, iron chloride 182, and calcium carbonate.

Figure 2:
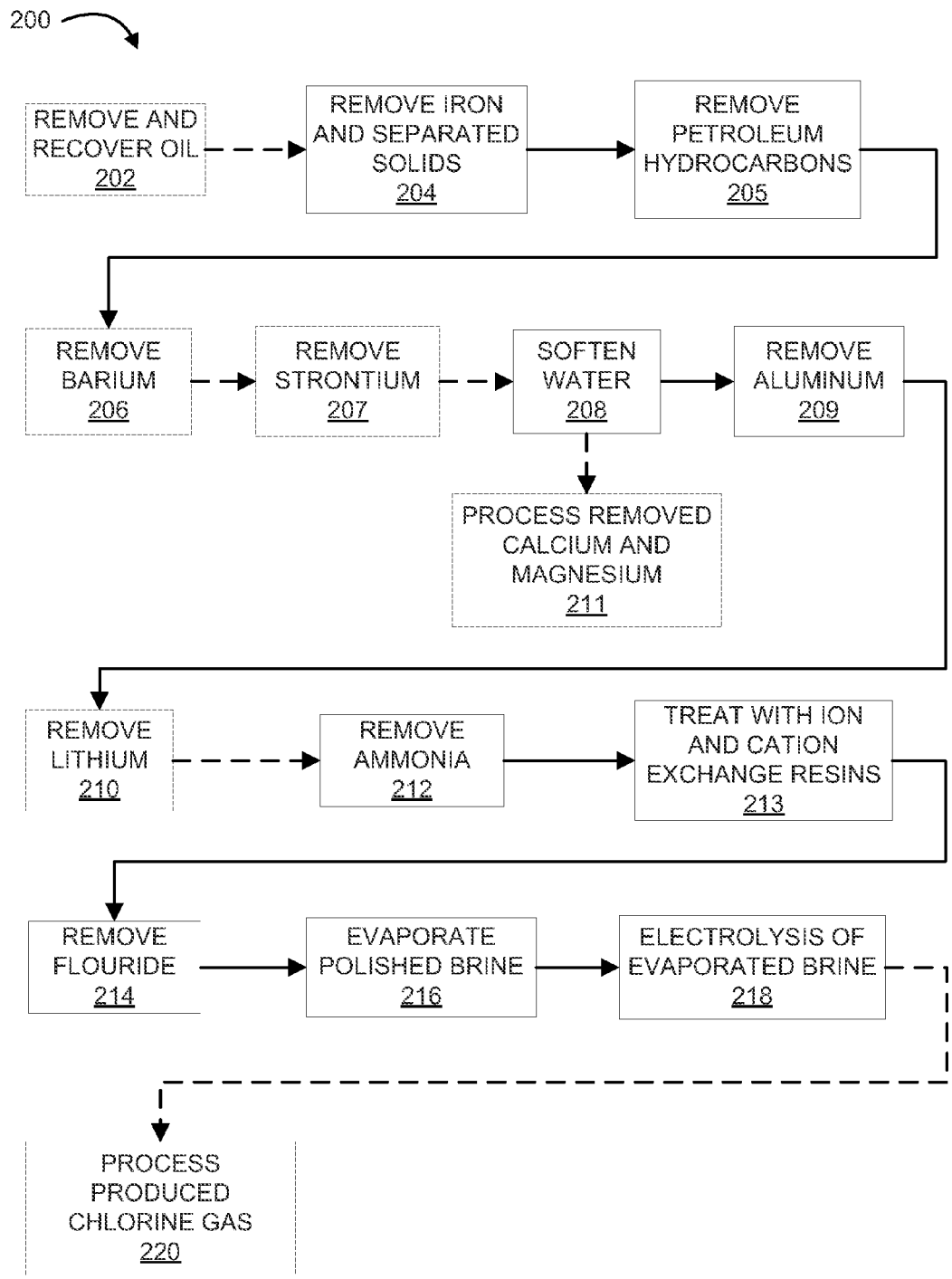
FIG. 2 illustrates an embodiment of a method for treating water.

FIG. 2 illustrates an embodiment of a method 200 for producing sodium hydroxide, hydrochloric acid, and/or sodium hypochlorite from contaminated water. As illustrated, in some embodiments, method 200 includes a removing and recovering oil operation 202. During operation 202, oil is removed and recovered from contaminated water to produce a reduced oil effluent. For example, one system for removing and recovering oil from contaminated water is to adjust the pH of the contaminated water to about 4-5 and then recover separated oil with an oil and water separator. For an example, see FIG. 1A. The recovered oil is suitable for sale.

Method 200 includes an iron and solids removal operation 204. During operation 204 iron and suspended solids are removed from the reduced oil effluent or influent water to produce an iron reduced effluent. In some embodiments, the solids and iron are removed by adding an oxidizer to oxidize ferrous iron to ferric iron and sulfides to sulfates. Next, a coagulant may be added to the oxidized water. The pH of the coagulated water is adjusted to a pH of 6.5-7.5. Next, flocculant is added to the pH adjusted water. After the addition of flocculant the iron and suspended solids in the water are removed. For an example, see FIG. 1A. Further, in some embodiments, the flocculated solids from the liquid/solids separation system are filtered and dewatered. The suspended solids may mainly include iron hydroxides and iron carbonates.

Next method 200 includes a first organics removal operation 205. During the operation 205, petroleum hydrocarbons are removed from the iron reduced effluent or reduced oil effluent to produce an organics reduced effluent. Petroleum hydrocarbons include gasoline, diesel, and oil range organics. In some embodiments, an ogano-clay system and activated carbon columns are utilized to reduce the petroleum hydrocarbons. In other embodiments, a polymeric exchange resin, such as an Optipore L493® resin and activated carbon columns are utilized to remove petroleum hydrocarbons. Operation 205 reduces TOC to 140 mg/l as well as removes over 99% of BTEX found in the iron reduced effluent.

In some embodiments, method 200 includes a barium removal operation 206. During operation 206, barium is removed from the reduced iron effluent to produce a reduced barium effluent. For example, during operation 206, the reduced barium effluent may be heated before being mixed with sulfuric acid and/or sodium sulfate at a stoichiometric amount to precipitate barium and strontium out as sulfates. This reaction is conducted under acidic conditions, optionally, in the presence of a high concentration of an oxidizer. The oxidizer may be, but is not limited to, hydrogen peroxide, sodium or potassium permanganates, sodium or potassium persulfates, ozone or other advanced oxidation technologies known to those skilled in the art. In some embodiments, the contact time in this step is less than 30 minutes. Next, for example, during operation 206, the pH of the reduced barium water is adjusted to raise the pH to a neutral level. This pH adjustment is beneficial for following solids/liquid separation steps, such as flocculation. Next, for instance, during operation 206, a flocculant is added to the pH adjusted water to help remove precipitated barium and strontium out of the water as sulfates. Optional oxidizer addition further oxidizes some of the residual petroleum hydrocarbons to reduce the total organic carbon (TOC). In some embodiments, the water is additionally filtered. In some embodiments, during operation 206 the separated, precipitated barium and/or strontium sulfate are dewatered and dried. The dried barium and/or strontium sulfate are suitable for sale.

In some embodiments, method 200 includes a strontium removal operation 207. During the strontium removal operation, strontium is removed from effluent to produce the strontium reduced effluent. The strontium removal operation 207 is performed after the first organics removal operation 205 and before the softening operation 208. In some embodiments, the strontium removal operation 207 utilizes a strontium specific ion exchange resin. For example, iron oxide coated sand may be utilized to reduce the levels of strontium in the water. The strontium removal operation 207 creates an effluent with less than 0.1% strontium. In some embodiments, water flowing into the strontium removal operation 207 has a concentration of strontium of about 5%. However, this level of strontium is exemplary only and will vary based on the produced/flowback water processed by method 200.

Further, method 200 includes a softening water operation 208. During operation 208, one or more of calcium and magnesium and other remaining contaminants are removed from the reduced barium effluent, strontium reduced effluent, or iron reduced effluent to produce a softened effluent or softened water. For example, the pH of the softened effluent is adjusted to about 10.5-12.0 by adding caustic or other alkali such as lime, or a combination thereof. The removal of fluorine as $CaF_2$ may be enhanced through the addition of lime and aluminum. In some embodiments, magnesium sulfate is added to assist in the removal of silica. In some embodiments, the fluorine is reduced to less than 1 mg/l. Once the pH adjustment is completed, soda ash or some form of carbonate or carbon dioxide gas is added to the pH adjusted water to precipitate out a stoichiometric amount of calcium as calcium carbonate and other contaminants as a carbonate or hydroxide. Alternatively, the soda ash may be added to the pH adjusted water prior to the addition of caustic.

Next, for example, a coagulant, consisting of any inorganic coagulant of iron or aluminum may be added to the pH adjusted water to promote particle growth. After the addition of the coagulant 108, a flocculant 113 is added to the water. After these additions, scale forming compounds are removed from the water, such as calcium as the carbonate, magnesium as the hydroxide, and silica as a magnesium silicate species. In additional embodiments, operation 208 removes total metals to levels below 100 ppb. In some embodiments, the water is further filtered.

In some embodiments, method 200 also includes a calcium processing operation 211. During the calcium processing operation, the removed calcium and magnesium is processed to produce at least one of calcium oxide and sodium carbonate. The removed solids, mainly including calcium carbon and magnesium hydroxide are dewatered and then rinsed with water to remove excess sodium chloride. In some embodiments, the solids produced from operation 208 are suitable for sale. In other embodiments, the dewatered solids from operation 208 are calcined to generate calcium oxide (quicklime). Additionally, the calcium oxide (or quicklime) may be sold for other uses. In additional embodiments, the calcined dewater solids are further processed with caustic soda and further dewatering to produce sodium carbonate during operation 211.

Method 200 includes an aluminum removal operation 209. During the aluminum removal operation 209, aluminum is removed from the softened effluent to produce a clarified effluent. Unexpectedly, the addition of extra aluminum during the soda softening operation 208 caused aluminum to precipitate out or come out of solution during following downstream pH adjustments. Operation 209 removes the precipitated aluminum to prevent fouling or interference with downstream component by the precipitated aluminum. During the aluminum removal operation 209, the pH is first adjusted to 6.5. After the pH adjustment, flocculant is added to the pH adjusted water. In some embodiments, the flocculent and sand are added in a tank. Next, during operation 209, precipitated aluminum is removed from the flocculated water. Based on $CO_2$ trapping in the aluminum, if no sand is utilized during the addition of flocculant, then the clarifier is a dissolved air floatation clarifier for removing the aluminum. If sand is utilized during the addition flocculant, then a gravity clarifier forming a ballasted system is utilized to remove the aluminum. In some embodiments, the ballasted clarifier is a BioMag™ or CoMag™ as sold by Siemens located at 4800 North Point Parkway, Suite 250, Alpharetta, Ga. 30022 USA.

In further embodiments, method 200 includes a removing aluminum/lithium operation 210. During operation 210, aluminum and lithium are removed from the clarified effluent to form a lithium reduced effluent. For example a precipitant is added to the softened effluent to precipitate out lithium and aluminum. Next, for example, the precipitated lithium and/or aluminum are separated out from the water. The recovered lithium may be sold for various applications after end processing as illustrated in FIG. 1F, such as extraction and dewatering.

Additionally, method 200 includes an ammonia removal operation 212. During operation 212, ammonia is removed from the clarified effluent or from the lithium reduced effluent to produce a purified brine. For example, during operation 212, the pH of the brine is adjusted to an elevated state with an alkali prior to passing through membrane system. Any alkali could be used in the pH adjustment tank. In some embodiments, the alkali is calcium or magnesium hydroxide. In alternative embodiments, the alkali is caustic soda which avoids redissolving hardness ions. In some embodiments, the membrane system is a system that allows the transport of ammonium ions across a semipermeable membrane into a cross flowing solution containing 1.0 normal sulfuric acid. The ammonia in the pH adjusted water reacts with the sulfuric acid to form ammonium sulfate. The ammonium sulfate is concentrated to up to 40% by weight by continuing to recycle the solution past the ammonia contacting membranes. This concentrated ammonium sulfate solution may be marketed and/or sold as a fertilizer for agricultural purposes. In some embodiments, the semipermeable membranes are Liqui-Cel® membranes as sold by Membrana located at 13800 South Lakes drive, Charlotte, N.C. 28273. The membrane system removes greater than 90% of ammonia from the water. For example, produced water containing 100 mg/l of ammonia elevated to a pH of 11.25 and heated to a temperature of 104 degrees Fahrenheit passed through a Liqui-Cel® membrane had an effluent ammonia concentration of 9 mg/l. In some embodiments, the sulfuric acid stream containing insoluble ammonium sulfate can be further separated during operation 212 to recover the ammonium sulfate. The ammonium sulfate may be sold for other applications. For example, the ammonium sulfate may be utilized as fertilizer.

Next, during operation 212, if additional ammonia removal is desired, the water from the membrane system is passed through a counter flow ammonia stripping tower or other suitable ammonia removal system if the ammonia concentration is greater than 2 mg/l. The ammonia, which is the predominant nitrogen species in produced water, may be removed, for example, by contacting a thin film of alkaline water to a high volume of air. The ratio of air to water is variable from 30 cfm to 1 lb of water up to 70 cfm per pound of water and is based upon the ammonia starting concentration and physics of the stripping tower. The air stream, containing ammonia is sent to a thermal oxidizer for conversion to nitrogen and discharged into the atmosphere.

After both ammonia removal operations (membrane system and tower), the water contains less than 1 mg/l. Alternatively, other suitable ammonia removal systems for method 200 as known by those skilled in the art may be utilized as long as these systems reduce the ammonia levels in the water to less than 1 mg/l.

Next, method 200 includes a treat operation 213. During treat operation 213 the purified brine is treated with weak acid cation and ion exchange resins to form a scale ion free brine. In some embodiments, the purified brine is passed through a weak acid cation (WAC) ion exchange column and a chelating ion exchange column to remove remaining calcium, barium, magnesium and/or strontium to ultra-low levels of less than 50 ppb. Any suitable ion exchange resin may be utilized in the WAC ion exchange column and the chelating ion exchange resin.

As illustrated, method 200 includes a remove fluoride operation 214. During the remove fluoride operation 214, fluoride is removed from scale ion free brine to produce a polished brine. For example, during operation 214 the scale ion free brine is pumped into a pressure vessel containing activated alumina to remove any remaining fluoride after softening. In some embodiments, the fluoride is removed to low levels to meet brine quality specifications, such as the specification shown in Example 1, Example 2 and/or Example 3 below. The activated alumina can be regenerated with hydrochloric acid and caustic soda. In some embodiment, operation 214 also includes pumping the polished brine into one or more activated carbon columns for final polishing and removal of trace contaminants prior to the removal of fluoride, such as iodine and some metals. Some organic substances will be removed in this step to continue to reduce the TOC.

Further, method 200 includes an evaporating operation 216. During operation 216, the polished brine is evaporated to produce a concentrated brine. For example, during operation 216, the polished brine is evaporated in an evaporative brine concentrator. The evaporation concentrates the TDS in the polished brine to be in a range of about 290,000-310,000 mg/l TDS as sodium chloride. In some embodiments, the evaporative brine concentrator is a mechanical vapor recompression, a multiple effect with falling film evaporator, or a rising film evaporator. Any suitable evaporative brine concentrator as known to those skilled in the art may be utilized in method 200. The steam from the evaporation may be condensed through cooling producing high quality distillate. For example, high quality distillate may be sent to cooling towers, used as boiler feed, or polished and discharged to a publicly owned treatment works (POTW) or a NPDES permit. In other embodiments, some of the high quality distillate may be used to preheat water or regenerate resin. The high quality distillate may also be sold.

Method 200 also includes an electrolysis operation 218. During operation 218, the concentrated brine is treated by electrolysis to produce sodium hydroxide, hydrochloric acid, and/or sodium hypochlorite. In some embodiments, during operation 218, the concentrated brine is treated by electrolysis to produce chlorine gas and/or hydrogen. For example, during operation 218, the concentrated brine containing approximately 290,000 to 310,000 mg/l of sodium chloride enters an electrolysis unit to convert the concentrated brine into sodium hydroxide, hydrogen, and chlorine gas in a membrane cell. The chlorine gas is combined with the hydrogen in a graphite furnace to convert them to hydrochloric acid. Additional hydrogen may be added to balance the reaction. Alternatively, sodium hypochlorite can be manufactured by the electrolysis unit instead of hydrochloric acid. Any known electrolysis units suitable for purifying brine may be utilized in method 200.

In additional embodiments, method 200 includes a chlorine gas process operation 220. During the chlorine gas process operation, chlorine gas produced by operation 218 is processed to produce iron chloride. The process includes mixing the chlorine gas with steel to form iron chloride. The iron chlorine may be suitable for storage and sale for other uses.

Figure 5:
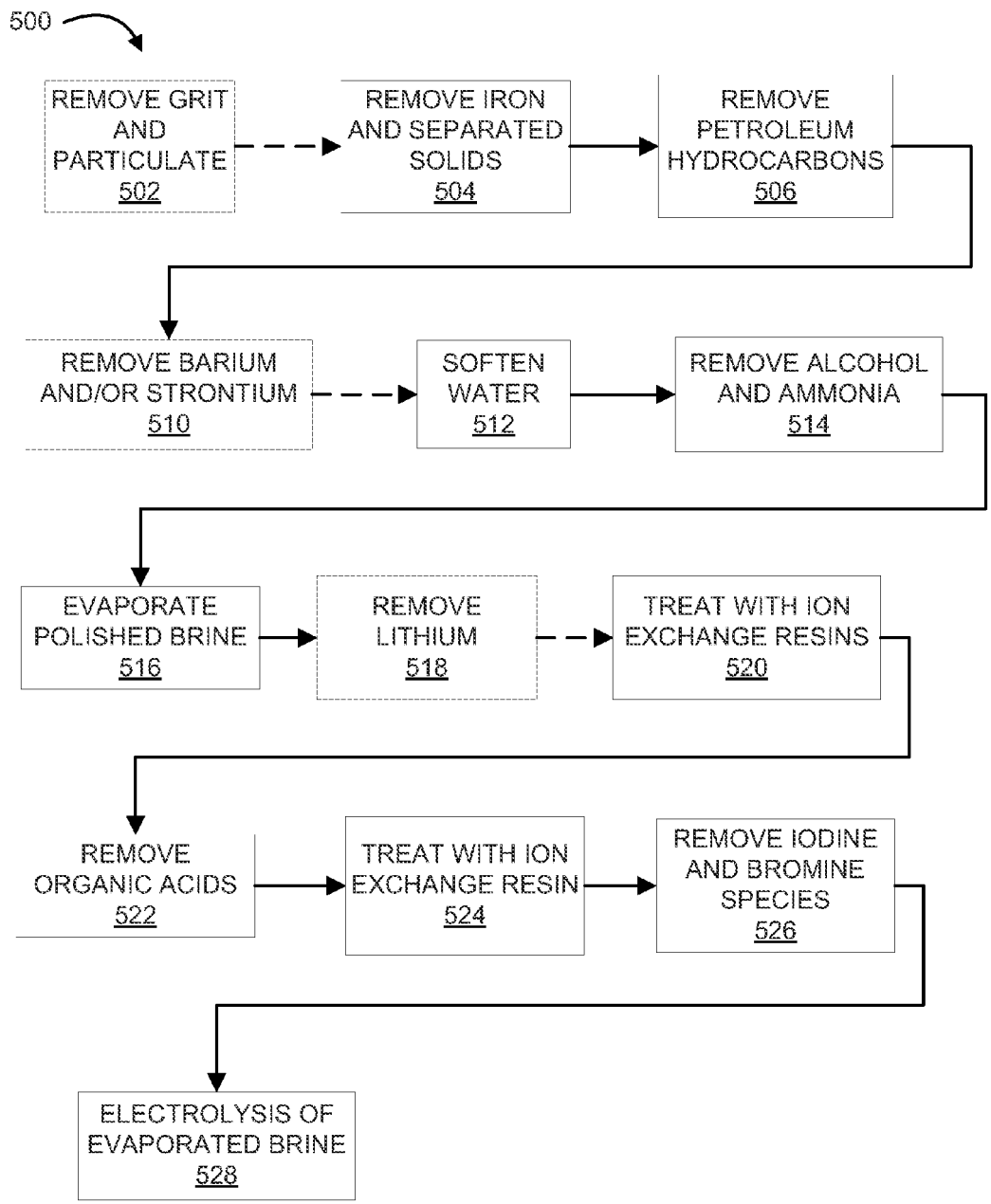
FIG. 5 illustrates an embodiment of a method for treating water.

Alternatively, FIG. 5 illustrates an embodiment of a method 500 for producing sodium hydroxide, hydrochloric acid, and/or sodium hypochlorite from contaminated water. Method 500 has some similar steps in common with method 200.

As illustrated, in some embodiments, method 500 includes a grit and particulate removing step 502. The grit and particulate removing step 502 removes grit and particulate from flowback/produced water. In some embodiments, the grit and particulate removing step 502 mechanically screens the flowback/produced water using wastewater screening equipment, such as hydrosieves, semi-automatic backwashing filters and rotary screens to form screened water. This screening removes large particulates which may affect the downstream steps. Any suitable screening system for treating the produced water may be utilized by the grit and particulate removing step 502.

Method 500 includes an iron and solids removal operation 504. During operation 504, iron and suspended solids are removed from the reduced oil effluent or influent water to produce an iron reduced effluent. In some embodiments during operation 504, the solids and iron are removed by adding an oxidizer to oxidize ferrous iron to ferric iron and sulfides to sulfates. Next, during operation 504, a coagulant may be added to the oxidized water. In some embodiments, during operation 504, the pH of the coagulated water is adjusted to a pH of 6.5-7.5. Next, during operation 504, flocculant is added to the pH adjusted water. After the addition of flocculant, the iron and suspended solids in the water are removed. For example, the iron and solids removal operation 504 may utilize a liquid/solids separation system as illustrated in FIG. 4A. Further, in some embodiments, the flocculated solids from the liquid/solids separation system are filtered and dewatered. The suspended solids may mainly include iron hydroxides and iron carbonates.

Next, method 500 includes a first organics removal operation 506. During the operation 506, at least a portion of the petroleum hydrocarbons are removed from the iron reduced effluent to produce an organics reduced effluent. Petroleum hydrocarbons include gasoline, diesel, and oil range organics. In some embodiments, an organo-clay system and/or a resin bed are utilized by the first organics removal operation 506 to reduce the petroleum hydrocarbons. In some embodiments, the resin bed is a polymeric exchange resin, such as an Optipore L493® resin. Operation 506 reduces TOC to 140 mg/l as well as removes over 99% of BTEX found in the iron reduced effluent.

In some embodiments, method 500 includes a barium and strontium removal operation 510. During operation 510, barium and/or strontium are removed from the reduced iron effluent to produce a reduced barium and strontium effluent. In some embodiments, the barium removal operation 510 includes a reaction tank, a pH adjust tank and a solid/liquid separator. In some embodiments, the reaction tank and the pH adjust tank are the same tank. In some embodiments, during operation 510, the reduced iron effluent is mixed with sulfuric acid and/or sodium sulfate at a stoichiometric amount to precipitate barium and strontium out as sulfates.

Next, for example, during operation 510, the pH of the water with the precipitated barium is adjusted to raise the pH to a neutral level. This pH adjustment is beneficial for following solids/liquid separation steps, such as flocculation. For instance, during operation 510, a flocculant is added to the pH adjusted water to help remove the precipitated barium and strontium out of the water as sulfates. Optional oxidizer addition further oxidizes some of the residual petroleum hydrocarbons to reduce the total organic carbon (TOC). In some embodiments, during operation 510, the water is additionally filtered. In some embodiments, during operation 510, the separated, precipitated barium and/or strontium sulfate are dewatered and dried. In some embodiments, the dried barium and/or strontium sulfate are suitable for sale.

Further, method 500 includes a softening water operation 512. During operation 512, one or more of calcium and magnesium and other remaining contaminants are removed from the reduced barium effluent, strontium reduced effluent, or iron reduced effluent to produce a softened effluent or softened water. For example, the pH of the softened effluent is adjusted to about 10.5-12.5 by adding caustic or other alkali such as lime, or a combination thereof. The removal of fluorine as $CaF_2$ may be enhanced through the addition of lime and aluminum. In some embodiments, magnesium sulfate is added to assist in the removal of silica. Once the pH adjustment is completed during operation 512, soda ash or some form of carbonate or carbon dioxide gas is added to the pH adjusted water to precipitate out a stoichiometric amount of calcium as calcium carbonate and other contaminants as a carbonate or hydroxide. Alternatively, during operation 512, the soda ash may be added to the pH adjusted water prior to the addition of caustic.

Next, for example, during operation 512, a coagulant, consisting of any inorganic coagulant of iron or aluminum may be added to the pH adjusted water to promote particle growth. After the addition of the coagulant during operation 512, a flocculant is added to the water. After these additions, scale forming compounds are removed from the water during operation 512, such as calcium as the carbonate, magnesium as the hydroxide, and silica as a magnesium silicate species. In additional embodiments, operation 512 removes total metals to levels below 100 ppb. In some embodiments, the water is further filtered. Additionally, in some embodiments, fluoride is also removed during operation 512. For example, during operation 512, the fluoride may be reduced to 0.2 mg/l or less. In some embodiments, operation 512 also includes a heat exchanger to heat the water prior entering the solids/liquid separator.

Method 500 also includes a second organics removal operation 514. During the operation 514, at least a portion of the alcohols and ammonia are removed from the softened water to produce an alcohol and ammonia reduced brine. Alcohols include methanol, ethanol, and/or propanol. In some embodiments, a steam stripper or distillation system is utilized by the second organics removal operation 514 to reduce the alcohols and ammonia. In additional embodiments during operation 514, the pH of the softened water is adjusted to a pH of at least 10.5 before the removal of the alcohols and the ammonia. In some embodiments during operation 514, the softened water is also filtered before the removal of the alcohols and the ammonia.

Further, method 500 includes an evaporating operation 516. During operation 516, the alcohol and ammonia reduced effluent is evaporated to produce a concentrated effluent. For example, during operation 516, the alcohol and ammonia reduced effluent is evaporated in an evaporative brine concentrator. The evaporation concentrates the TDS in the alcohol and ammonia reduced effluent to be in a range of about 290,000-310,000 mg/l TDS as sodium chloride. In some embodiments, the evaporative brine concentrator is a mechanical vapor recompression, a multiple effect with falling film evaporator, or a rising film evaporator. Any suitable evaporative brine concentrator as known to those skilled in the art may be utilized in method 500. The steam from the evaporation during operation 516 may be condensed through cooling producing high quality distillate. For example, high quality distillate may be sent to cooling towers, used as boiler feed, or polished and discharged to a publicly owned treatment works (POTW) or a NPDES permit. In other embodiments, some of the high quality distillate may be used during operation 516 to preheat water or regenerate resin. The high quality distillate may also be sold.

In some embodiments, method 500 includes a removing lithium operation 518. During operation 518, lithium is removed from the concentrated effluent to form a lithium reduced effluent. During operation 518, the pH of the concentrated effluent is adjusted to about 8.0 to 8.5 and then a precipitant is added to the pH adjusted concentrated effluent to precipitate out lithium. In some embodiments the precipitant is an aluminum salt, such as aluminum chloride or aluminum chlorohydrate. In other embodiments, the lithium is precipitated using electrocoagulation and aluminum electrodes. In some embodiments during operation 518, for every 1 mg/L of lithium in the water, 3.89 mg/L of precipitant is added to the water to precipitate out the lithium. Next, during operation 518, the precipitated lithium is separated out from the water during operation 518 to form the lithium reduced effluent. In some embodiments, operation 518 utilizes a solids/liquid separator to separate out the precipitated elements. In some embodiments, the precipitated elements are an aluminum/lithium sludge.

The aluminum/lithium sludge or the precipitated elements may be further treated to recover lithium for resale and storage. The precipitated solids are rinsed with a weak acidic and/or hot water. In some embodiments, the weak acidic water has a pH from about 5 to 7. In some embodiments, the hot water has a temperature of about 60 to 70 degrees Celsius. The lithium is removed in the rinse water to form a lithium rinse water. In some embodiments, after rinsing, a hydrated aluminum oxide is formed. In some embodiments, the hydrated aluminum oxide formed by rinsing is utilized as the precipitant to precipitate out the lithium from the concentrated effluent. Next, during operation 518, the lithium rinse water is concentrated to form a concentrated rinse solution. In some embodiments during operation 518, the lithium rinse water is concentrated by evaporation. Next, during operation 518, sodium carbonate is added to the concentrated rinse solution to form lithium carbonate. The recovered lithium carbonate may be sold for various applications.

Next, method 500 includes a treat operation 520. During treat operation 520 the concentrated effluent or the lithium reduced effluent is treated with weak acid cation and ion exchange resins to form a scale ion free brine. In some embodiments, the concentrated effluent or the lithium reduced effluent during operation 520 is passed through a weak acid cation (WAC) ion exchange column and a chelating ion exchange column to remove remaining calcium, barium, magnesium and/or strontium to ultra-low levels of less than 50 ppb. Any suitable ion exchange resin may be utilized in the WAC ion exchange column and the chelating ion exchange resin.

Method 500 also includes a third organics removal operation 522. During the third organics removal operation 522, the scale ion free brine is treated to remove at least a portion of the organic acids. Unexpectedly, the influent water contained a high amount of organic acid that was not removed by the first and second organics removal operations 506 and 514 or any following downstream operations. The organic acids include acids such as acetic acid, propionic acid, and butyric acid. During the third organics removal operation 522, the pH of the scale ion free brine is depressed to less than 2 to form a pH reduced brine. During the third organics removal operation 522, the pH reduced brine is run through activated carbon made from coconut shells to produce an organic acid reduced brine. The third organics removal operation 522 utilizes this unique and unexpected combination of activated carbon made from coconut shells at a pH of less than 2 to get the desired removal percentage of the organic acids. For example, the third organics removal operation 522 produces an organic acid reduced brine having a TOC of 10 mg/l or less.

Accordingly, in some embodiments, the third organics removal operation 522 includes a reduction tank and one or more activated carbon columns. During pH reduction during the third organics removal operation 522, in some embodiments, an inorganic sulfite or phosphite species is also added to the scale ion free brine. The addition of an inorganic sulfite or phosphite species to the scale ion free brine allows the removal of iodine and bromide species in the downstream bromine and/or Iodine removing operation 526. Bromate and iodate are converted to bromide and iodide through chemical oxidation/reduction conducted under acidic conditions. The reducing agent can be any inorganic sulfite or phosphite species known to those in the industry to function as reducing agents. Chemicals such as sodium sulfite, sodium bisulfite, sodium metabisulfite and sodium thiosulfate can be used interchangeably in the reduction tank.

Additionally, the activated carbon columns can be regenerated onsite using steam during the third organics removal operation 522. The ability to regenerate the filters and to regenerate the filters onsite was an unexpected advantage. The organic acids removed by the activated carbon filters have fairly low boiling points, such as about 110 to 130 degrees Celsius. Accordingly, reasonable steam temperatures can be utilized to regenerate the activated carbon columns.

Method 500 also includes an ion exchange treatment operation 524. During an ion exchange treatment operation 524, the organic acid reduced brine is treated with an ion exchange resin to remove trace metals such as calcium, magnesium and/or iron that may have been present in the activated carbon of the third organics removal operation 522 and that may have dissolved from the carbon into the brine to form polished brine. The ion exchange resin during operation 524 exchanges those ions and others for sodium ions and can be operated at any pH from a pH of 2 to a pH of 12 depending upon which metals are present. In some embodiments, during the ion exchange treatment operation 524, the pH of the organic acid reduced brine is depressed to less than 4 prior to being sent through the ion exchange resin. The ion exchange resin has a finite capacity to absorb other ions and once that capacity has been reached, the resin must be regenerated during operation 524. For example, during operation 524, solutions of mineral acids (HCl or sulfuric) may be passed through the resin. Accordingly, in some embodiments, during the ion exchange treatment operation 524, the resin bed is regenerated. The resin is regenerated during the ion exchange treatment operation 524 rinsing the resin with pure water and then a solution of a strong alkali such as sodium hydroxide or potassium hydroxide. The sodium and/or potassium ions displace the acid protons and complete the regeneration step. The rinsing of the resin is followed by another rinsing during operation 524. This regeneration during the ion exchange treatment operation 524 may be performed any suitable number of times.

Method 500 further includes a bromine and/or iodine removing operation 526. During the bromine and/or iodine removing operation 526, bromine and iodine in the polished effluent are oxidized and removed to form a bromine reduced brine. Accordingly, during the bromine and/or iodine removing operation 526, an oxidizer and mineral acid are added to the polished brine. The oxidizer turns the bromine and iodine into gaseous elemental bromine and iodine gas. In some embodiments, the oxidizer is the chlorine generated by the electrolysis operation 528. The mineral acid is utilized to depress the pH to less than 3.0. The oxidation reaction occurs at elevated temperatures up to 100 degrees Celsius and at pH of less than 2.0. Accordingly, in some embodiments, during the bromine and/or iodine removing operation 526, the polished brine is heated to elevated temperatures. During the bromine and/or iodine removing operation 526, the oxidized solution is passed into the top of an air stripping tower whereby air or steam is blown countercurrent to the downward spraying of the solution. The stripping tower is filled with media with significant surface area whereby the water forms a monomolecular layer and allows the gaseous bromine and iodine to be transferred into the air stream. The air stream exits the stripping tower laden with chlorine, bromine and iodine. In some embodiments, during the bromine and/or iodine removing operation 526, the air stream exiting the stripping tower is reclaimed using a wet chemical scrubber.

Method 500 also includes an electrolysis operation 528. During operation 528, the bromine reduced effluent is treated by electrolysis to produce sodium hydroxide, hydrochloric acid, and/or sodium hypochlorite. In some embodiments, prior to electrolysis during operation 528, the pH of the bromine reduced influent is increased to about 6 or higher using alkalis 111. In some embodiments, prior to electrolysis during operation 528, the pH of the bromine reduced influent is increased to about 6 to 11. In some embodiments, the alkalis are sodium hydroxide. The pH increase accentuates electrolysis of the water during operation 528. The ideal pH for operation 528 varies based on the influent water and the electrolysis unit. In some embodiments, during operation 528, the bromine reduced effluent is treated by electrolysis to produce chlorine gas and/or hydrogen. For example, during operation 528, a bromine reduced effluent enters an electrolysis unit to convert the concentrated brine into sodium hydroxide, hydrogen, and chlorine gas in a membrane cell. In some embodiments, the bromine reduced effluent contains approximately 290,000 to 310,000 mg/l of sodium chloride. The chlorine gas is combined with the hydrogen in a graphite furnace to convert them to hydrochloric acid. Additional hydrogen may be added to balance the reaction. Alternatively, sodium hypochlorite can be manufactured by the electrolysis unit instead of hydrochloric acid. Any known electrolysis units suitable for purifying brine may be utilized in operation 528 of method 500.

In additional embodiments, method 500 includes a chlorine gas process operation. During the chlorine gas process operation, chlorine gas produced by operation 528 is processed to produce iron chloride. The process includes mixing the chlorine gas with steel to form iron chloride. The iron chloride may be suitable for storage and sale for other uses.

The sodium hydroxide, hydrochloric acid, chlorine gas, hydrogen gas, iron chloride, and/or sodium hypochlorite produced by method 200 are all high purity products due to the use of high purity brine. There is a good market for high purity products, such as sodium hydroxide, hydrogen, sodium hypochlorite, and hydrochloric acid.

EXAMPLES

Example 1

In one embodiment, the brine and analyte specification shown below in Table 1 are fed into the inlet of the electrolysis unit 155 as shown in FIG. 1C.

TABLE 1

Example brine and analyte specification for electrolyzer.

| Component | | | Unit |
|---|---|---|---|
| NaCl | approx. | 300-310 | gpl |
| NaOH | excess approx. | 0.2 | g/l |
| $Na_2CO_3$ | excess approx. | 0.4 | g/l |
| Br | max. | 50 | ppm |
| Co | max. | 10 | Ppb |
| Ca + Mg | max. | 20 | Ppb |
| Sr | max. | 60 | Ppb |
| I | max. | 0.2 | Ppm |
| Ba | max. | 0.5 | Ppm |
| $Na_2SO_4$ | max. | 10 | Gpl |
| $NaClO_3$ | max. | 10 | Gpl |
| $SiO_2$ | max. | 5 | Ppm |
| Al | max. | 0.1 | Ppm |
| Ni | max. | 10 | Ppb |
| Mn | max. | 150 | Ppb |
| Hg | max. | 0.1 | Ppm |
| Pb | max. | 50 | Ppb |
| Nitrogen Compounds (as N) | max. | 1 | Ppm |
| Fe | max. | 50 | Ppb |
| F | max. | 1 | Ppm |
| $H_2O_2$ | max. | 0.2 | Ppm |
| Suspended Solids | solids max. | 0.5 | Ppm |
| Total Heavy Metal (as Pb) | max. | 0.2 | Ppm* |
| TOC | max. | 7 | Ppm |
| pH | | 8-10.5 | |
| Temperature | approx. | 65 | deg. C. |
| Pressure | approx. | 2 | bar g |
| Flow Rate | approx. | ___ | $m^3/h$ |

*Total heavy metals include the total of: Pb, Co, Mn, Cr, Cd, Cu, Zn, Ti, Mo, and Li.

Example 2

In another embodiment, the brine and analyte specification shown below in Table 2 are fed into the inlet of the electrolysis unit 155 as shown in FIG. 1C.

TABLE 2

Example brine and analyte specification for electrolyzer.

| Component | Unit | Salt with Primary Treatment Max. | Vacuum Salt w/o Primary Max |
|---|---|---|---|
| Fluoride | ppm (ug/g) | 3 | 3 |
| Acetate** | ppm | | |
| Formate** | ppm | | |
| Nitrite*** | ppm | | |
| Sulfate | ppm | | |
| Bromide | ppm | 150 | 150 |
| Nitrate*** | ppm | | |
| Phosphate | ppm | | |
| Iodide | ppm | 0.6 | 0.6 |
| Sulfur | ppm | 60 | 60 |
| Total Organic Carbon | ppm (ug/g) | 10 | 10 |
| Ag | ug/g | | |
| Al | ug/g | 1.5 | 0.5 |
| As* | ug/g | | |
| Ba | ug/g | 0.75 | 0.75 |
| Be | ug/g | | |
| Ca | ug/g | 0.3% | Ca + Mg < 30 |
| Cd* | ug/g | | |
| Co* | ug/g | 20 ppb | 20 ppb |
| Cr* | ug/g | | |
| Cu* | ug/g | | |
| Fe | ug/g | 3 | 3 |
| Hg | ug/g | 0.3 | 0.3 |
| K | ug/g | | |
| Li | ug/g | | |
| Mg | ug/g | 0.35% | Ca + Mg < 30 |
| Mn* | ug/g | 450 ppb | 450 ppb |
| Mo* | ug/g | | |

TABLE 2-continued

Example brine and analyte specification for electrolyzer.

| Component | Unit | Salt with Primary Treatment Max. | Vacuum Salt w/o Primary Max |
|---|---|---|---|
| Na | ug/g | | |
| Ni* | ug/g | 0.6 | 0.6 |
| P | ug/g | | |
| Pb* | ug/g | 150 ppb | 150 ppb |
| Sb* | ug/g | | |
| Se | ug/g | | |
| Si | ug/g | 15 as $SiO_2$ | 15 as $SiO_2$ |
| Sn* | ug/g | | |
| Sr | ug/g | 300 | 6 |
| Ti* | ug/g | | |
| Tl | ug/g | | |
| V | ug/g | | |
| W | ug/g | | |
| Zn* | ug/g | | |
| Zr | ug/g | | |

*Total heavy metals include the total of: Pb, Co, Mn, Cr, Cd, Cu, Zn, Sn, Ti, Mo, Ni, As, and Sb. The limit is 0.6 ppm.
** Included in TOC
*** Nitrogen compounds (as NH4): max 3 ppm Example 3

In another embodiment, the brine and analyte specification shown below in Table 3 are fed into the inlet of the electrolysis unit 155 as shown in FIG. 1C.

TABLE 3

Example brine and analyte specification for electrolyzer.

| Component | Units | AKCC (Asahi Kasel) | CEC (Chlorine Engineers) | Ineos | Uhde |
|---|---|---|---|---|---|
| Feed Brine pH | — | 10.5-11.5 | ≈ 9 | <11.6* | 0-10.5 |
| NaOH Excess | g/L | — | — | — | <0.4 |
| $Na_2CO_3$ Excess | g/L | — | — | — | <0.8 |
| NaCl | g/L | 300-310 | 300-315 | >270 | 305 ± 5 |
| $Na_2SO_4$ | g/L | <7.4 | 08-Apr | <8* | 10-Jun |
| $NaClO_3$ | g/L | — | <10 | <31.9 | <10 |
| Ca + Mg | ppm w/w | ≤0.02 | <0.02 | <0.02 | <0.02 |
| Mg | ppm w/w | — | — | <0.01 | — |
| Sr | ppm w/w | ≤0.1 | <0.4 | <0.1 | <0.4 |
| Ba | ppm w/w | ≤0.1 | <0.5 | <0.1 | <0.1 |
| Soluble $SiO_2$ | ppm w/w | ≤5 | <5 | <5 | <5 |
| Total $SiO_2$ | ppm w/w | — | — | <15 | — |
| Al | ppm w/w | ≤0.1 | <0.1 | <0.1 | <0.1 |
| Fe | ppm w/w | ≤0.05 | <0.1 | <0.15 | <0.050 |
| Hg | ppm w/w | ≤0.1 | <0.1 | <0.50 | <0.1 |
| Mn | ppm w/w | — | <0.01 | <0.05 | <0.15 |
| Ni | ppm w/w | ≤0.01 | <0.01 | <0.01 | <0.01 |
| Pb | ppm w/w | — | — | <0.05 | <0.05 |
| Co | ppm w/w | — | — | — | <0.01 |
| Total Heavy Metals (Except Hg) | ppm w/w | — | <0.1 | — | <0.2 |
| Iodine | ppm w/w | ≤0.1 | <0.2 | <0.2 | <0.2 |

TABLE 3-continued

Example brine and analyte specification for electrolyzer.

| Component | Units | AKCC (Asahi Kasel) | CEC (Chlorine Engineers) | Ineos | Uhde |
|---|---|---|---|---|---|
| Fluorine | ppm w/w | — | <0.5 | — | <1 |
| Bromine | ppm w/w | ≤30 | — | — | <50 |
| Free $Cl_2$ | ppm w/w | nil | — | Non Detectable | <0.1 |
| SS | ppm w/w | ≤0.5** | <1.0 | — | <0.5 |
| TOC | ppm w/w | ≤10 | <10 | — | <7 |
| NH4 | ppm w/w | — | — | — | <1 |
| Temperature | deg. F. | ≈140 | 140-149 | >140 | 122-176 |
| Pressure | psig | ≥43 | ≈29 | — | — |

*@ 23 deg. C.
**mg/L
— Spec Not Stated

In this example, once the electrolysis is completed, the dechlorinated brine is recycled to a brine saturation and evaporation system. The flow rate of the dechlorinated brine is about 120 gpm at 100 short ton/day NaOH (dry basis) cell production. Example concentrations for the dechlorinated brine are illustrated below in Table. 4.

TABLE 4

Example concentrations for the dechlorinated brine.

| Component | Units | Value |
|---|---|---|
| Dechlorinated Brine | pH | 9 |
| NaCl | g/L | 200 ± 5 |
| $Na_2SO_4$ | g/L | 10 |
| $NaClO_3$ | g/L | 10 |
| $Na_2SO_3$ | ppm water | 20 |
| Temperature | Degrees Fahrenheit | ~176 |

Example 4

In some embodiments, the influent water (or produced/flowback water) treated in the contaminated water treatment system, such as system 10 as shown in FIG. 1A includes contaminants at the ranges listed in TABLE 4 below:

TABLE 4

Produced/Flowback Influent Water Quality Ranges

| Parameter | Influent Concentration (mg/l) |
|---|---|
| Aluminum | .08-1.2 |
| Barium | .5-15,700 |
| Calcium | 29-34,000 |
| Cobalt | .03-.6 |
| Fluoride | 4-780 |
| Iron | 1-810 |
| Lead | .02-.5 |
| Manganese | .2-15 |
| Magnesium | 9-3190 |
| Nickel | .01-.14 |
| Nitrogen | 12-382 |
| Silicon dioxide | 9-100 |
| Strontium | .5-5841 |

TABLE 4-continued

Produced/Flowback Influent Water Quality Ranges

| Parameter | Influent Concentration (mg/l) |
|---|---|
| TOC (total organic carbon) | 69-1080 |
| Total Heavy Metals | >2 |
| TSS | 30-2000 |

Example 5

FIGS. 3A-3D illustrate an embodiment of a water treatment system 300 for treating contaminated water to produce a purified brine according to the principles of the present disclosure. FIGS. 3A-3D show a pilot system 300 that processed influent wastewater. Each of the components of FIGS. 3A-3D are fully described in further detail in the description of FIGS. 1A-1C above. However, due to the small scale and limitations of a pilot system, several mix tanks and/or pH adjust tanks were combined and/or combined with other components. Further, due to the small scale and batch processing of a pilot system, additional equalization tanks were also utilized in system 300 which were not utilized in system 10 as illustrated in FIGS. 1A-1C and as discussed above. Additionally, FIGS. 3A-3D also utilize additional heaters 45 and filters 48 based on the small scale and design of the pilot system, which were not illustrated or discussed above in FIGS. 1A-1C.

The influent waste water that ran through the pilot system 300 illustrated in FIGS. 3A-3D was analyzed and the components of the influent water or raw water are shown in Table 5 below. Water at various stages of treatment within the pilot system 300 was analyzed. The results of this analysis are listed in Table 5 below. Each position of water analysis has been labeled with a letter as shown in Table 5 below. Each position of water analysis is shown in FIG. 5 via the letter label.

TABLE 5

Water analysis results at different positions during treatment for pilot system

| Element | Raw Water "A" (mg/l) | DAF Inf. "B" (mg/l) | DAF Eff. "C" (mg/l) | Optipore Eff. "D" (mg/l) | Barium Clarifier Eff. "E" (mg/l) | Softening Effluent "F" (mg/l) | Chelate Eff. "G" (mg/l) | UF Eff. "H" (mg/l) |
|---|---|---|---|---|---|---|---|---|
| Ag | ND | ND | ND | ND | ND | ND | ND | ND |
| Al | 3.29 | 0.98 | 1.47 | 1.3 | 0.88 | 3.04 | 3.04 | 0.67 |
| Ba | 6318 | 7012 | 6833 | 6974 | 0.37 | 0.04 | 0.04 | 0.06 |
| B | 9.39 | 9.12 | 8.85 | 9.17 | 8.84 | 3.52 | ND | 4.69 |
| Bi | ND | ND | ND | ND | ND | ND | ND | ND |
| Ca | 13519 | 14992 | 14592 | 14875 | 13407 | 0.72 | 0.07 | ND |
| Co | ND | ND | ND | ND | ND | ND | ND | ND |
| Cd | ND | ND | ND | ND | ND | ND | ND | ND |
| Cr | ND | ND | ND | ND | ND | ND | ND | ND |
| Cu | 0.01 | ND | ND | ND | ND | 0.01 | ND | ND |
| Fe | 25.54 | ND | ND | ND | ND | ND | ND | ND |
| Ga | ND | ND | ND | ND | ND | 0.09 | ND | ND |
| Hg | ND | ND | ND | ND | ND | ND | ND | ND |
| In | ND | ND | ND | ND | 0.19 | ND | ND | ND |
| K | 258.57 | 277.95 | 281.7 | 295.15 | 286.46 | 198.39 | 154.71 | 189.6 |
| Li | 101.61 | 113.93 | 114.53 | 120.24 | 124.87 | 65.78 | 15.21 | 57.77 |
| Mg | 1174 | 1393 | 1377 | 1393 | 1307 | 0.09 | ND | ND |
| Mn | 2.6 | 1.47 | 1.49 | 1.53 | 1.91 | ND | ND | ND |
| Mo | 0.01 | ND | 0.02 | ND | ND | ND | ND | ND |
| Na | 32482 | | | | 39330 | 62191 | 61978 | 60692 |
| Ni | ND | ND | ND | ND | 0.03 | ND | ND | ND |
| Pb | 0.32 | ND | ND | ND | ND | ND | ND | ND |
| Se | ND | ND | ND | ND | ND | ND | ND | ND |
| Si | 3.2 | 0.5 | 0.7 | 0.74 | 0.39 | 1.52 | 0.95 | ND |
| Sn | ND | ND | ND | ND | ND | ND | ND | ND |
| Sr | 3188 | 3530 | 3458 | 3522 | 1992 | 0.28 | 0.05 | 1.83 |
| Ti | ND | ND | ND | ND | ND | ND | ND | ND |
| Tl | ND | ND | ND | ND | ND | ND | ND | ND |
| Zn | 1.32 | 0.19 | 0.11 | 0.11 | ND | ND | ND | ND |
| TSS | 131.3 | 221.67 | 53.33 | ND | | | | ND |
| NH3 | 130 | | | | | 82 | 16.6 | 15 |
| Methanol | 150 | | | | | | | ND |

ND - signifies that amount present was so small that the amount was not determinable As illustrated by Table 5, a significant portion of the containments present in the raw water are no longer present in the effluent water from the ultrafiltration system (UF). For example, aluminum has been reduced from 3.29 mg/L to 0.67 mg/L, barium has been reduced from 6318 mg/L to 0.06 mg/l, calcium has been reduced from 13519 mg/L to a not determinable amount, iron has been reduced from 25.54 mg/L to a non-determinable amount, and etc. Unexpectedly, the influent water contained methanol which was removed by the pilot system 300. Accordingly, the pilot system 300 shows the effectiveness of one embodiment of a water treatment system as described.

Numerous other changes may be made which will readily suggest themselves to those skilled in the art and which are encompassed in the spirit of the disclosure. While various embodiments have been described for purposes of this disclosure, various changes and modifications may be made which are well within the scope of the present invention. Numerous other changes may be made which will readily suggest themselves to those skilled in the art and which are encompassed in the spirit of the disclosure.

What is claimed is:

1. A system for treating contaminated water to produce at least one of sodium hydroxide, hydrochloric acid, and sodium hypochlorite comprises:
   a coagulation tank that oxidizes and coagulates effluent from waste water influent;
   a first pH adjustment tank that adjusts a pH of effluent from the coagulation tank and is downstream of the coagulation tank;
   a first floc mix tank that adds a first flocculant to effluent from the first pH adjustment tank and is located downstream of the first pH adjustment tank;
   an iron clarifier that separates iron from effluent from the first floc mix tank and is located downstream of the first floc mix tank;
   at least one multimedia filter that filters effluent from the iron clarifier and is located downstream of the iron clarifier;
   a first organics removal system that removes at least petroleum hydrocarbons from effluent from the at least one multimedia filter and is located downstream of the at least one multimedia filter;
   a second pH adjustment tank that adjusts the pH of effluent from the first organics removal system and is located downstream of the first organics removal system;
   a softening clarifier that removes calcium carbonate and magnesium hydroxide sludge from effluent from the second pH adjustment tank and is located downstream of the second pH adjustment tank;
   a third pH adjustment tank that adjusts the pH of effluent from the softening clarifier and is located downstream of the softening clarifier;
   a filter that removes colloidal solids from effluent from the third pH adjustment tank and is located downstream of the third pH adjustment tank;
   a second organics removal system that removes at least alcohol and ammonia from effluent from the filter and is located downstream of the first organics removal system;
   an evaporative brine concentrator that concentrates effluent from the second organics removal system, wherein effluent from the evaporative brine concentrator is a concentrated purified brine and is located downstream of the second organics removal system;
   a weak acid cation ion exchange column and a first chelating ion exchange column that removes any remaining calcium and remaining magnesium to a level of less than 50 ppb from effluent from the evaporative brine concentrator and is located downstream of the evaporative brine concentrator;
   a reduction tank that depresses the pH and reduces bromate and iodate in effluent from the first chelating ion exchange column and is located downstream of the weak acid cation exchange column;
   a third organics removal system that removes at least organic acid from effluent from the reduction tank and is located downstream of the reduction tank;
   a fourth pH adjustment tank that adjusts the pH of effluent from the third organics removal system and is located downstream of the third organics removal system;
   a second chelating ion exchange column that removes trace metals from effluent from the fourth pH adjustment tank and is located downstream of the fourth pH adjustment tank;
   a fifth pH adjustment tank that adjusts the pH of effluent from the second chelating ion exchange column and is located downstream of the second chelating ion exchange column;
   a bromine oxidation tank that removes bromine and iodine from effluent from the fifth pH adjustment tank and is located downstream of the fifth pH adjustment tank;
   a sixth pH adjustment tank that adjusts the pH of effluent from the second chelating ion exchange column and is located downstream of the bromine oxidation tank; and
   at least one electrolysis unit that converts the concentrated purified brine into at least one of sodium hydroxide, hydrochloric acid, and sodium hypochlorite and is located downstream of the sixth pH adjustment tank.

2. The system of claim 1, further comprising:
   a waste water screening device that removes grit and particulates from the waste water influent before the coagulation tank; and
   at least one first equalization tank that equalizes flow and concentration of the effluent from the waste water screening device before the coagulation tank.

3. The system of claim 1, wherein the reduction tank depresses the pH to give the effluent from the reduction tank a pH of less than 2,
   wherein the third organics removal system is coconut shell activated carbon.

4. The system of claim 1, further comprising:
   a barium removal system that removes barium sulfate and strontium sulfate from effluent from the first organics removal system.

5. The system of claim 1, wherein the softening clarifier further removes strontium sulfate from the effluent from the second pH adjustment tank.

6. The system of claim 1, wherein the system for treating contaminated water further produces at least one of chlorine gas and iron chloride.

7. The system of claim 1, wherein the first organics removal system is at least one of an organo-clay system and a resin bed.

8. The system of claim 1, wherein the second organics removal system includes a distillation tower.

9. The system of claim 1, wherein the effluent from the second organics removal system has an ammonia concentration of less than 1 mg/l,
   wherein the first organics removal system produces water with a total organic content of less than 140 mg/l and removes over 99% of BTEX,
   wherein the softening clarifier removes total metals to levels below 100 ppb, and
   wherein the third organics removal system produces water with the total organic content of 10 mg/l or less.

10. The system of claim 1, wherein the first pH adjustment tank adjusts the pH to a pH from 6.5 to 7.5,
    wherein the second pH adjustment tank adjusts the pH to a pH from 10.5 to 12.5,
    wherein the third pH adjustment tank adjusts the pH to a pH of at least 10.5,
    wherein the reduction tank adjusts the pH to a pH of less than 2, wherein the fourth pH adjustment tank adjusts the pH to a pH less than 4, wherein the fifth pH adjustment tank adjusts the pH to a pH of 3 or less, wherein the sixth pH adjustment tank adjusts the pH to a pH from 6 to 11.

11. A method for producing at least one of sodium hydroxide, hydrochloric acid, and sodium hypochlorite from contaminated water comprises:

removing iron from influent water to produce an iron reduced effluent;

removing petroleum hydrocarbons from the iron reduced effluent to produce a petroleum hydrocarbon reduced effluent;

removing at least one of calcium and magnesium from the petroleum hydrocarbon reduced effluent to produce a softened effluent;

removing at least alcohol and ammonia from the softened effluent to produce an alcohol and ammonia reduced brine;

evaporating the alcohol and ammonia reduced brine to produce a concentrated brine;

removing at least organic acid from the concentrated brine to produce an organic acid reduced brine;

removing iodine and bromine species from the organic acid reduced brine to produce a polished brine; and treating the polished brine with electrolysis to produce at least one of sodium hydroxide, hydrochloric acid, and sodium hypochlorite.

12. The method of claim 11, wherein the step of treating the concentrated brine with the electrolysis further produces chlorine gas.

13. The method of claim 12, further comprising:
processing the chlorine gas to produce iron chloride.

14. The method of claim 11, wherein the step of removing at least one of the calcium and the magnesium from the petroleum hydrocarbon reduced effluent additionally removes fluoride from the petroleum hydrocarbon reduced effluent.

15. The method of claim 11, further comprising:
removing barium and strontium from the petroleum hydrocarbon reduced effluent before performing the step of removing at least one of the calcium and the magnesium.

16. The method of claim 11, wherein the step of removing at least one of the calcium and the magnesium from the petroleum hydrocarbon reduced effluent additionally removes strontium from the petroleum hydrocarbon reduced effluent.

17. The method of claim 11, wherein the step of removing at least the organic acid from the concentrated brine includes depressing the concentrated brine to a pH of less than two to form a pH depressed concentrated brine and then treating the pH depressed concentrated brine with activated carbon made from coconut shells.

18. The method of claim 11, wherein the step of removing the petroleum hydrocarbons includes treating influent water with a dissolved air floatation device and treating the iron reduced effluent with a at least one of a resin bed and an organo-clay system, and wherein the step of removing at least the alcohol and ammonia includes treating the softened effluent with a distillation tower.

19. A system for treating contaminated water to produce at least one of sodium hydroxide, hydrochloric acid, and sodium hypochlorite comprises:

a separated solids and iron removal system;

a first organics removal system that removes at least petroleum hydrocarbons located downstream of the separated solids and iron removal system;

a soda softening system located downstream of the first organics removal;

a second organics removal system that removes alcohol and ammonia and that is located upstream of a brine evaporation system and downstream from the first organics removal system;

the brine evaporation system located downstream of the soda softening system and the second organics removal system;

a third organics removal system that removes at least organic acid located downstream of the brine evaporation system; and an electrolysis system located downstream of the third organics removal system, wherein the system is configured to produce at least one of sodium hydroxide, hydrochloric acid, and sodium hypochlorite.

* * * * *